US008429608B2

(12) United States Patent
Son et al.

(10) Patent No.: US 8,429,608 B2
(45) Date of Patent: Apr. 23, 2013

(54) METHOD AND APPARATUS FOR PROVIDING IMPLICIT VARIABILITY RULES FOR COMPONENT MODEL AND ARCHITECTURE DESIGN

(75) Inventors: Kyung-Ho Son, Suwon-si (KR); Ja-gun Kwon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1258 days.

(21) Appl. No.: 12/035,747

(22) Filed: Feb. 22, 2008

(65) Prior Publication Data

US 2009/0070735 A1 Mar. 12, 2009

(30) Foreign Application Priority Data

Sep. 7, 2007 (KR) .................. 10-2007-0091136

(51) Int. Cl.
*G06F 9/44* (2006.01)
(52) U.S. Cl.
USPC ........... 717/117; 717/104; 717/107; 717/121; 717/123; 706/47; 706/50; 706/59
(58) Field of Classification Search .......... None
See application file for complete search history.

(56) References Cited

U.S. PATENT DOCUMENTS

| | | | | |
|---|---|---|---|---|
| 5,295,222 A * | 3/1994 | Wadhwa et al. | ............. | 717/104 |
| 6,341,369 B1 * | 1/2002 | Degenaro et al. | ............. | 717/117 |
| 6,549,969 B1 * | 4/2003 | Hsu et al. | ............. | 710/304 |
| 7,114,157 B2 * | 9/2006 | Chaffee et al. | ............. | 718/104 |
| 7,137,101 B1 * | 11/2006 | Ehnebuske et al. | ............. | 717/108 |
| 7,386,835 B1 * | 6/2008 | Desai et al. | ............. | 717/117 |
| 7,448,022 B1 * | 11/2008 | Ram et al. | ............. | 717/120 |
| 8,285,700 B2 * | 10/2012 | Steelberg et al. | ............. | 707/708 |
| 2002/0083149 A1 * | 6/2002 | Van Huben et al. | ............. | 709/215 |
| 2002/0083243 A1 * | 6/2002 | Van Huben et al. | ............. | 710/107 |
| 2002/0091736 A1 * | 7/2002 | Wall | ............. | 707/513 |
| 2002/0129345 A1 | 9/2002 | Tilden et al. | | |
| 2004/0015833 A1 * | 1/2004 | Dellarocas et al. | ............. | 717/106 |
| 2004/0122853 A1 * | 6/2004 | Moore | ............. | 707/103 R |
| 2004/0170318 A1 * | 9/2004 | Crandall et al. | ............. | 382/165 |
| 2005/0114083 A1 * | 5/2005 | Bullis | ............. | 702/183 |
| 2005/0240812 A1 * | 10/2005 | Anderson et al. | ............. | 714/11 |

(Continued)

FOREIGN PATENT DOCUMENTS

| | | |
|---|---|---|
| JP | 04-362739 A | 12/1992 |
| JP | 2004-252973 A | 9/2004 |
| KR | 10-2003-0059504 A | 7/2003 |

OTHER PUBLICATIONS

Title: Variability Management with ACM (Adaptable Component Model) for Insurance Product Line, author: Jeong Ah Kim, source: IEEE, dated: 2006.*

(Continued)

*Primary Examiner* — Chameli Das
(74) *Attorney, Agent, or Firm* — Sughrue Mion, PLLC

(57) ABSTRACT

A method and apparatus for providing variability rules for component model and architecture design are provided. The apparatus includes a category-determination unit which determines a category of implicit variability rules with respect to variability-set component model elements and elements associated with the variability-set component model elements; and an implicit-variability-rule-application unit which applies the implicit variability rules, which are given to the category, to the elements associated with the variability-set component model elements.

12 Claims, 46 Drawing Sheets

U.S. PATENT DOCUMENTS

| | | | | |
|---|---|---|---|---|
| 2006/0129906 A1* | 6/2006 | Wall | | 715/500 |
| 2006/0294150 A1* | 12/2006 | Stanfill et al. | | 707/200 |
| 2007/0245298 A1* | 10/2007 | Grabarnik et al. | | 717/104 |
| 2008/0259930 A1* | 10/2008 | Johnston et al. | | 370/395.2 |
| 2009/0143928 A1* | 6/2009 | Ghaly | | 701/19 |

OTHER PUBLICATIONS

Title: Rule-based component development, author: Jeong Ah Kim et al, source: IEEE, dated: 2005.*

* cited by examiner

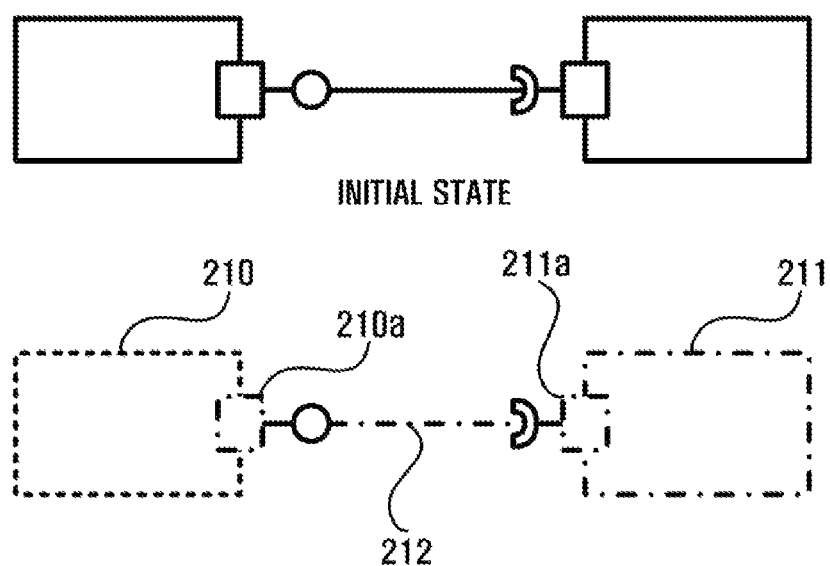

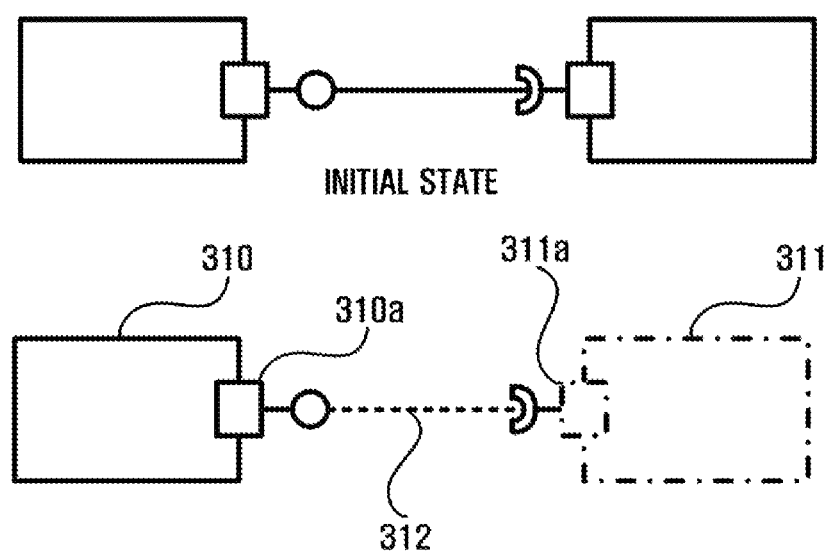

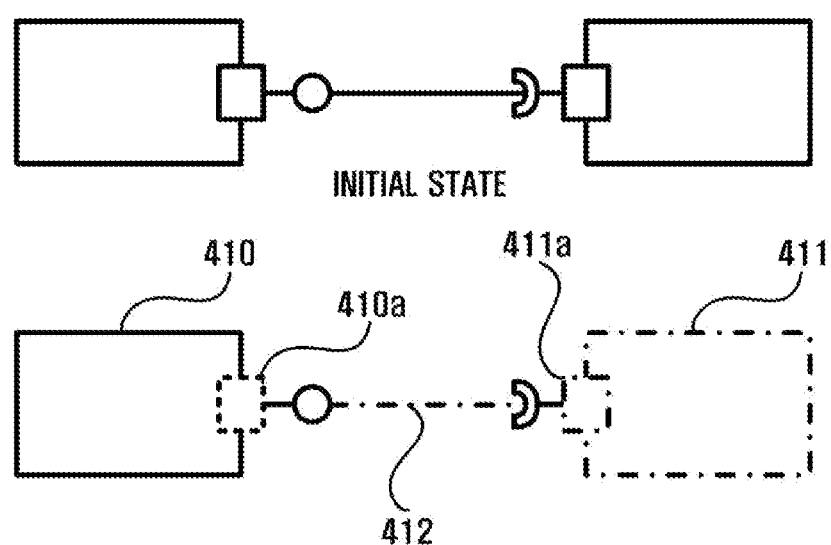

FIG. 11A

```
component A {
    provides {
        I_A ipl_A;
    }
}
```

```
component B {
    provides {
        I_A ipl_A;
    }
}
```

```
component B1 {
    provides {
        I_B1 ipl_B1;
    }
}
```

```
component B2 {
    provides {
        I_B2 ipl_B2;
    }
}
```

```
component B {
    contains {
        B1 cB1;       ⎫
        B2 cB2;       ⎬ 1121
    }                 ⎭
    provides {
        I_B1 ipI_B1;  ⎫
        I_B2 ipI_B2;  ⎬ 1122
    }                 ⎭                    ⎫ 1120
    connects {
        connect cB1.ipI_B1 to ipI_B1;  ⎫
        connect cB2.ipI_B2 to ipI_B2;  ⎬ 1123
    }                                  ⎭
};
```

FIG. 11C

```
component L {
    contains {
        A1 cA1;
        A2 cA2;      } 1131
        D  cD;
    }
    requires {
        L_C irL_C;   } 1132
    }
    connects {
        connect cD.irl_A to switch {
            cA1.ipl_A on VAR1 = 'value1' ,    } 1133
            cA2.ipl_A on VAR2 = 'value1'
        };
        connect cD.irl_C to irl_C;     } 1134
    }
    configuration-variables {
        VAR1 values ( "value1" , "value2" ) on default  "value1" ;  } 1135
    }
};
```
{ 1130

FIG. 11D

```
component M {
    contains {
        B cb optional on VAR2 = "on" ;     ⎫1141
        C cC;
    }
    provides {            ⎫1142
        l_C ipl_C;
    }
    connects {
        connect cC.irl_B1 to cB1.ipl_B1;   ⎫
        connect cC.irl_B2 to cB2.ipl_B2;   ⎬1143
        connect cC.ipl_C to ipl_C;         ⎭
        }
    }
    configuration-variables {
        VAR2 values ( "on" , "off" ) on default "on" ;   ⎫1144
    }
};
```

⎫1140

```
component T1 {
    contains {
        APM cAPM;      }1211
        COM cCOM;
    }
    connects {
        connect cAPM.ipl_APM to cCOM.irl_APM;  }1212
    }
};

component APM {
    provides {
        I_APM ipl_APM;   }1213
    }
} component COM {
    requires {
        I_APM irl_APM optional on VAR2 = "on" ;   }1214
    }
        configuration-variables {
        VAR2 values [ "on" , "off" ] on default "on" ;   }1215
        }
};
```

}1210

```
component T1 {
    contains {
        APM cAPM optional on VAR1 = "on"    } 1221
        COM cCOM;
    }
    connects {
        connect cAPM.ipl_APM to cCOM.irl_APM;
    }                                                  } 1220
    configuration-variables {
        VAR1 values [ "on" , "off" ] on default "on" ; } 1222
    }
};
```

```
component APM {
    provides {
        I_APM ipI_APM optional on VAR1 =   "on"  ⎫1231
    }                                             ⎬
    configuration-variables {                     ⎫         ⎬1230
        VAR1 values [ "on" , "off" ] on default   "on" ;  ⎬1232
    }                                             ⎭
};
```

METHOD AND APPARATUS FOR PROVIDING IMPLICIT VARIABILITY RULES FOR COMPONENT MODEL AND ARCHITECTURE DESIGN

CROSS REFERENCE TO RELATED APPLICATION

This application claims priority from Korean Patent Application No. 10-2007-0091136, filed on Sep. 7, 2007 in the Korean Intellectual Property Office, the disclosure of which is incorporated herein by reference in its entirety.

BACKGROUND OF THE INVENTION

1. Field of the Invention

Methods and apparatuses consistent with the present invention relate to providing implicit variability rules for component model and architecture design, and more particularly, to simplifying complex interlocking relationship setting by implicit rules for component model-based software design including variability elements, thereby rapidly and accurately creating sophisticated design information.

2. Description of the Related Art

A software product line operating system constructs the system architecture by combining components in the software assets management, and assigning setting conditions to the components for each software product, thereby supporting a structured and rapid development process.

Software architecture design represents various setting conditions by variability, and allows complex internal interlocking relationship setting and product configuration to be performed by associating components with variability.

Variability affects all of the associated elements according to objects to be applied. Accordingly, the connection relationship for variability setting needs to be analyzed in detail, thereby preventing automatic interlocking setting and setting errors.

However, Unified Modeling Language (UML) does not sufficiently support the variability elements for software architecture design, and as a result, it can only represent a regular structure of a specific software system.

SUMMARY OF THE INVENTION

The present invention provides a method and apparatus which simplify complex interlocking relationship setting including variability with implicit rules for component model-based software design.

According to the aspect of the present invention, there is provided an apparatus for providing variability rules for component model and architecture design, comprising a category-determination unit determining a category of implicit variability rules with respect to variability-set component model elements and elements associated with the variability-set component model elements; and an implicit-variability-rule-application unit applying the implicit variability rules, which are given to the category, to the elements associated with the variability-set component model elements.

According to the aspect of the present invention, there is provided a method of providing variability rules for component model and architecture design, comprising setting variability of component model elements; determining a category of implicit variability rules with respect to the variability-set component model elements and elements associated with the variability-set component model elements; and applying the implicit variability rules, which are given to the category, to the elements associated with the variability-set component model elements.

BRIEF DESCRIPTION OF THE DRAWINGS

The above and other aspects of the present invention will become more apparent by describing in detail exemplary embodiments thereof with reference to the attached drawings in which:

FIGS. 2A to 2D are diagrams showing a case where implicit variability rules are applied to an optional component, according to an exemplary embodiment of the present invention;

FIGS. 3A and 3B are diagrams showing a case where implicit variability rules are applied to an optional connection, according to an exemplary embodiment of the present invention;

FIGS. 4A to 4D are diagrams showing a case where implicit variability rules are applied to an optional interface, according to an exemplary embodiment of the present invention;

FIGS. 11A through 11F are diagrams showing examples of descriptions that are represented by a component-description language-processing unit according to an exemplary embodiment of the present invention, and corresponding elements;

DETAILED DESCRIPTION OF EXEMPLARY EMBODIMENTS OF THE INVENTION

Figure 1:
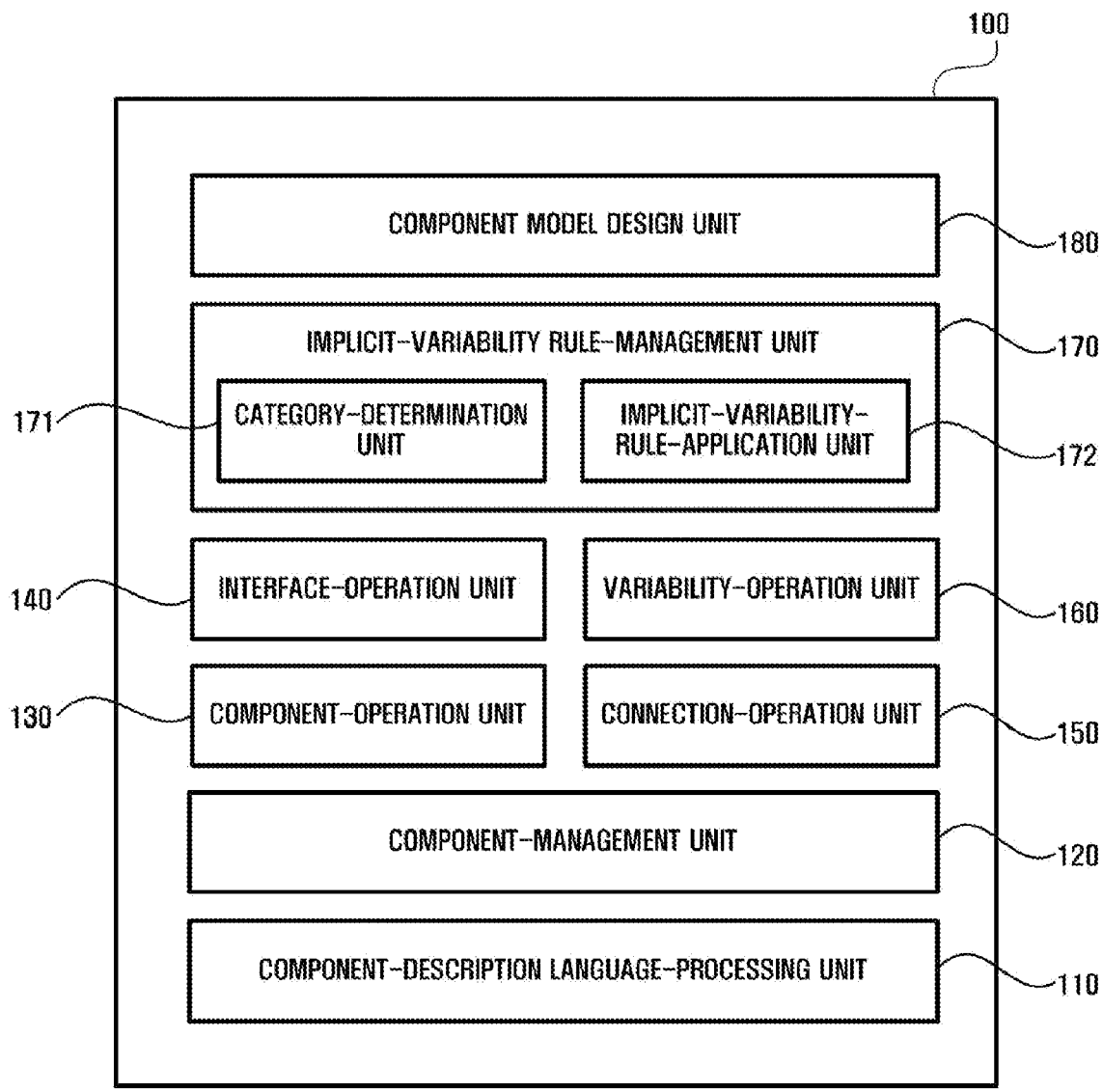
FIG. 1 is a block diagram showing the configuration of an apparatus for providing variability rules for component model and architecture design according to an exemplary embodiment of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention is described hereinafter with reference to flowchart illustrations of user interfaces, methods, and computer program products according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

FIG. 1 is a block diagram showing the configuration of an apparatus for providing variability rules for a component model and architecture design according to an exemplary embodiment of the present invention.

An apparatus 100 for providing variability rules for a component model and architecture design according to an exemplary embodiment of the present invention includes a component-description language-processing unit 110 that processes a component description language (CDL), which describes a component model, a component-management unit 120 that maintains and changes the component model using the component description language, a component-operation unit 130 that manages information on a list of components in the component model and dependency relationships between the components, an interface-operation unit 140 that manages a list of interface elements in the component model and connection information between a component and an interface, a connection-operation unit 150 that manages a list of connection elements in the component model and connection information for each connection, a variability-operation unit 160 that manages a list of variability elements in the component model and setting condition information for each variability, a category-determination unit 171 that determines a category of implicit variability rules with respect to variability-set component model elements and elements associated with the variability-set component model elements, an implicit-variability-rule-application unit 172 that applies the implicit variability rules, which are given to the category, to the elements associated with the variability-set component model elements, and a component model design unit 180 that changes the variability representations of the elements, to which the implicit variability rules are applied.

Each unit according to an exemplary embodiment of the present invention shown in FIG. 1 may be implemented as, but is not limited to, a software or hardware component, such as a Field Programmable Gate Array (FPGA) or Application Specific Integrated Circuit (ASIC), which performs certain tasks.

The unit may advantageously be configured to reside on the addressable storage medium and configured to execute on one or more processors.

Accordingly, the unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The functionality provided for in the components and units may be combined into fewer components and units or further separated into additional components and units.

For reference, the basic configuration for component model-based software architecture design according to an exemplary embodiment of the present invention will be schematically described.

The component model has three elements: component, interface, and connection.

The component is an element that is representative of a logic module or a sub-system, the interface represents a specific function set that is provided by components, and the connection is an element that represents the dependency relationship between provide-and-require interfaces.

The variability elements are inserted to give setting conditions with respect to the elements component, interface, and connection.

For reference, in the component description language that describes the component model, the representations of the variability elements are made by configuration variables. By combining the configuration variables and the elements, software architecture design information may include the specifications on variability.

Herein, the variability may be basically divided into "Option" for determining whether to select, and "Alternative" and "Selective" as an expanded aggregate concept. In addition, "Mandatory" explicitly represents that selection is inevitably made. The detailed descriptions thereof will be described below.

1) Option: it is determined according to conditions on whether to include a component model element marked "Option".

That is, in view of presence/absence of an element itself, a canonical expression of zero or one (0 . . . 1) is used. "Option" is independently given to an individual element.

2) Alternative: "Alternative" setting is commonly made for a plurality of associated component model elements.

That is, in this case, when the variability is represented by grouping elements, which are affected by the same configuration variable setting, only one element is selected.

The canonical expression of "Alternative" is one and only one (1 . . . 1), and one is inevitably selected.

3) Selective: "Selective" setting is commonly made for a plurality of associated component model elements. This is similar to "Alternative" setting.

For "Selective" setting, however, when the variability is represented by grouping the elements, which are affected by the same configuration variable setting, one or more elements may be selected.

The canonical expression of "Selective" is zero or more (0 . . . *). Specifically, no element or a plurality of elements are selected.

4) Mandatory: even if the implicit variability rules are applied, an element marked "Mandatory" is maintained as a basic selection element while the variability attribute is not automatically changed. This may be used to prevent an unintentional change in creating design information.

With respect to the individual elements of the component model for software architecture design, it is necessary to consider how much other associated elements are affected when the above-described variabilities are applied.

This means that it is necessary to grasp how setting of one element in the component model changes the previously set elements while a complex internal structure is designed.

In the large-scale complex structure design, by determining, automating, and applying the above-described relationships, the productivity of design work and the accuracy of design information can be improved. In addition, if automatic setting is explicitly controlled, the flow of design work can be consistently maintained.

In exemplary embodiments of the present invention, the implicit correlation that affects other associated elements during variability setting between elements is grasped while the variability setting is applied together with the component model. The correlation is named "implicit variability rules".

First, in the apparatus 100 shown in FIG. 1, the component-description language-processing unit 110 processes the component description language (CDL) that describes the component model.

The component-description language-processing unit 110 primarily includes configuration information of a primitive component and a composite component, and supports a description format that defines a variable corresponding to a variation point.

Here, the primitive component means a unit component. The composite component may be formed by combining a plurality of primitive components.

For constructing the software product, in a composite component that includes a variable characteristic or a variation point where the corresponding characteristic exists, a list of description blocks that are represented by the component-description language-processing unit 110 is as follows.

1) Contains: A list of sub-components that are included in a composite component.

2) Provides: A list of provide interfaces of the components. In the case of the composite component, a list of provide interfaces that are provided from the components.

3) Requires: A list of required interfaces of the components. In the case of the composite component, this is a list of interfaces that are required by the sub-components.

4) Connects: A connection relationship between the provide-and-require interfaces.

5) Configuration-variables: A list of variables corresponding to a variation point and values.

If a software platform is formed by a component model, the configuration information of the software platform is represented by a combination of the components and the configuration variables. The configuration variables are elements of the CDL that represents the variability.

The component-management unit 120 maintains and changes the component model using the component description language. The configuration of the changed component model is described by the component-description language-processing unit 110.

The interface-operation unit 140 manages a list of interface elements in the component model and connection information between a component and an interface.

The elements for software architecture design are components, and the interface elements are added to represent functions to be provided or required by the components. The interface represents the function set. An interaction with other components can be performed when a component notation is marked an interface notation.

The connection-operation unit 150 manages a list of connection elements in the component model and connection information for each connection.

The component notations attached with an interface are associated by connection notations in order to represent the mutual interlocking relationship. The connections are directly associated through the interfaces. The component notations represent the dependency relationship through connections between the provide/require interfaces or the interface delegation relationship for interface expose between the composite component and the sub-component.

The variability-operation unit 160 manages a list of variability elements in the component model and setting condition information for each variability.

In software architecture design, variability coupling is a representation element that allows a combination of various software products according to settings.

The variability may be applied to the component, the interface, or the connection, and represents an aggregate of associated elements, for example, "Option", "Alternative", or "Selective".

The variability is represented by the configuration variables in the component model. Accordingly, the variability-operation unit 160 actually manages a list of configuration variables and setting condition information.

For reference, in software architecture design, the entity is constructed by arranging various elements forming the component model and by adding the mutual association relationship and the variability setting. As described above, the variability setting affects the elements subject to the setting and other elements associated with the elements.

For this reason, when the variability setting of the associated elements is not appropriately changed during the variability configuration, an error may occur in the entire component model structure or a combination configuration may not be performed.

For example, in a configuration where a component A needs a component B, if only the component B is marked "Option", the component A does not have necessary functions and is then included in the combination configuration according to conditions. As a result, an error occurs.

The category-determination unit 171 and the implicit-variability-rule-application unit 172 may be incorporated into an implicit-variability rule-management unit 170.

The implicit-variability rule-management unit 170 determines whether the variability is set on a specific component model element, analyzes what implicit variability rule the setting needs, and finally informs the component model design unit 180 of what is to be changed.

To this end, the category-determination unit 171 determines a category of implicit variability rules with respect to the variability-set component model elements and the elements associated with the variability-set component model elements. The implicit-variability-rule-application unit 172 applies the implicit variability rules, which are given to the category, to the elements associated with the variability-set component elements.

The component model design unit 180 changes the variability representations of the elements to which the implicit variability rules are applied.

To this end, the component model design unit 180 adds, deletes, and changes component, interface, connection, and variability notations, which are elements forming the component model. In addition, the component model design unit 180 updates the notations of elements determined by the implicit-variability rule-management unit 170 that implicit variability rules need to be applied to.

FIGS. 2A to 2D are diagrams showing a case where implicit variability rules are applied to an optional component, according to an exemplary embodiment of the present invention. There are a provide component that provides a specific function and a require component that uses the function to be provided by the provide function. In addition, an interface exists in each component, and the interfaces are associated with each other by the connections.

For purposes of illustration, it is assumed that a user deletes one of the provide component and the require component (corresponding to "Option" among the variabilities) under explicit restriction.

For reference, in the exemplary embodiments of the present invention, a component that is explicitly restricted by the user is indicated by a black dotted line, a component and at least one element that are affected by a changed component are indicated by a black broken-dotted lines, and a component model element that is not affected by the user's explicit restriction is indicated by a solid line.

FIG. 2A is a diagram showing an example where the user explicitly applies an optional attribute to the provide component.

When a component is deleted, the interface is affected by the component. Accordingly, if a provide component 210 is deleted, a provide interface 210a is also deleted by optional processing.

If the provide component 210 and the provide interface 210a are deleted, a connection 212 becomes insignificant and is deleted. In addition, if the connection 212 is deleted, a require interface 211a associated with the connection 212 is also deleted.

In a state where the require interface 211a is deleted, a require component 211 does not function, and thus the require component 211 may also be deleted.

Figure 2B:
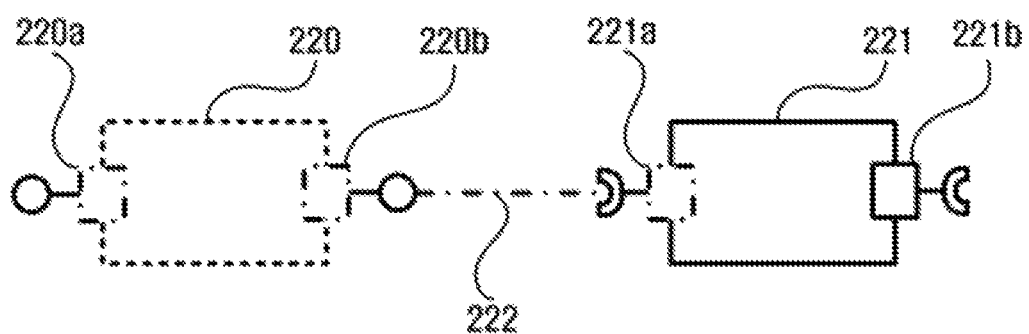

FIG. 2B is a diagram showing an example where the user explicitly applies an optional attribute to a require component. FIG. 2B is different from FIG. 2A in that there are two provide interfaces and two require interfaces.

For explanatory convenience, an interface that is located on a left side of each component is referred to as a first interface, and an interface that is located on a right side thereof is referred to as a second interface.

When a component is deleted, an interface is affected by the component. Accordingly, if a provide component 220 is deleted, a first provide interface 220a and a second provide interface 220b are also deleted by optional processing.

If the provide component 220 and the provide interfaces 220a and 220b are deleted, a connection 222 becomes insignificant and is deleted, and a first require interface 221a associated with the connection 222 is also deleted.

At this time, unlike FIG. 2A, a require component 221 and a second require interface 221b are not deleted. This is because a provide interface (not shown) of a different provide component (not shown) and the second require interface 221b are associated by a connection (not shown).

Figure 2C:
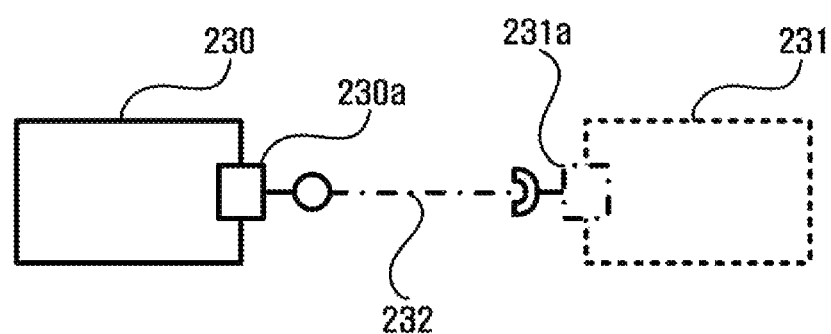

FIG. 2C is a diagram showing an example where the user explicitly applies an optional attribute to a require component.

When a component is deleted, an interface is affected by the component. Accordingly, if a require component 231 is deleted, a require interface 231a is also deleted by optional processing.

If the require component 231 and the require interface 231a are deleted, a connection 232 becomes insignificant and is deleted.

At this time, a provide component 230 and a provide interface 230a are not affected even if the connection 232 is deleted. This is because the provide component 230 and the provide interface 230a are elements that provide functions, unlike the require component 231 and the require interface 231a, and thus they are associated with a require interface (not shown) of a different require component (not show) to provide their functions.

Figure 2D:
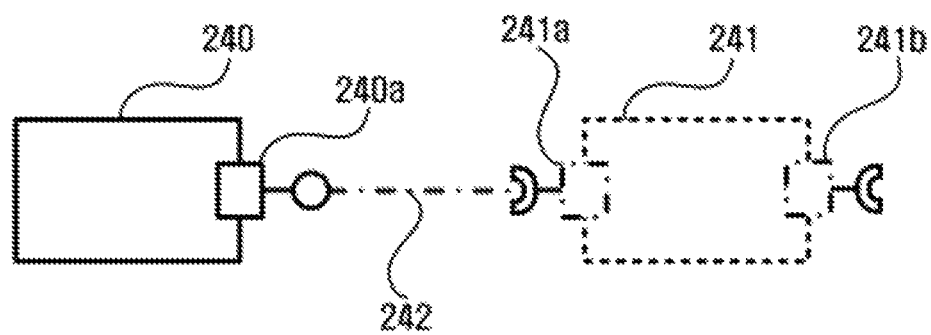

FIG. 2D is a diagram showing an example where the user explicitly applies an optional attribute to a require component. FIG. 2D is different from FIG. 2C in that there are two require interfaces.

For explanatory convenience, an interface 241a that is located on a left side of a require component 241 is referred to as a first require interface, and an interface 241b that is located on a right side thereof is referred to as a second require interface.

When a component is deleted, an interface is affected by the component. Accordingly, if a require component 241 is deleted, a first require interface 241a and a second require interface 241b are both deleted by optional processing.

If the require component 241 and the require interfaces 241a and 241b are deleted, a connection 242 becomes insignificant and is deleted.

At this time, a provide component 240 and a provide interface 240a are not affected even if the connection 242 is deleted. This is because, as described with reference to FIG. 2B, the provide component 240 and the provide interface 240a are elements that provide functions, unlike the require component 241 and the require interfaces 241a and 241b, and thus they are associated with a require interface (not shown) of a different require component (not shown) to provide their functions.

Figure 3B:
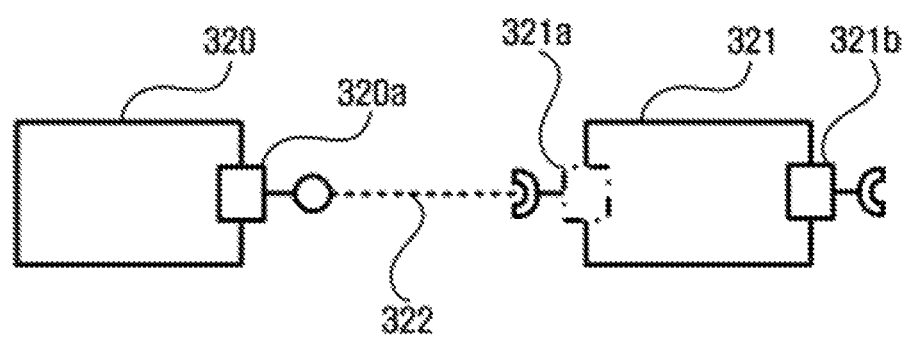

FIGS. 3A and 3B are diagrams showing a case where implicit variability rules are applied to an optional connection, according to an exemplary embodiment of the present invention. There is a provide component that provides a specific function and a require component that uses the function provided by the provide component. In addition, an interface exists in each component, and the interfaces are associated with connections.

At this time, it is assumed that a user optionally deletes each connection under explicit restriction.

Referring to FIG. 3A, when the user explicitly deletes a connection 312, a require interface 311a associated with the connection 312 is deleted. If the require interface 311a is deleted, a require component 311 does not function, and thus the require component 311 may also be deleted.

At this time, a provide component 310 and a provide interface 310a are not affected even if the connection 312 is deleted. This is because, as described with reference to FIGS. 2C and 2D, the provide component 310 and the provide interface 310a are elements that provide functions, unlike the require component 311 and the require interface 311a, and thus they are associated with a require interface (not shown) of a different require component (not shown) to provide their functions.

FIG. 3B is a diagram showing an example where the user explicitly deletes a connection. FIG. 3B is different from FIG. 3A in that there are two require interfaces.

For explanatory convenience, an interface 321a that is located on a left side of a require component 321 is referred to as a first require interface, and an interface 321b that is located on a right side thereof is referred to as a second require interface.

If the user explicitly deletes a connection 322, the first require interface 321a associated with the connection 322 is deleted, while the require component 321 and the second require interface 321b are not deleted. This is because a provide interface (not shown) of a different provide component (not shown) and the second require interface 321b may be associated with each other.

At this time, the reason why the provide component 320 and the provide interface 320a are not affected even if the connection 322 is deleted is as described with reference to FIG. 3A.

FIGS. 4A to 4D are diagrams showing a case where implicit variability rules are applied to an optional interface, according to an exemplary embodiment of the present invention. There is a provide component that provides a specific function and a require component that uses the function provided by the provide component. In addition, an interface exists in each component, and the interfaces are associated with each other by connections.

At this time, it is assumed that the user optionally deletes each interface under explicit restriction.

Referring to FIG. 4A, when the user explicitly deletes a provide interface 410a, a connection 412 becomes insignificant and is deleted, and a require interface 411a associated with the connection 412 is deleted. Then, if the require interface 411a is deleted, a require component 411 does not function, and thus the require component 411 may also be deleted.

Figure 4B:
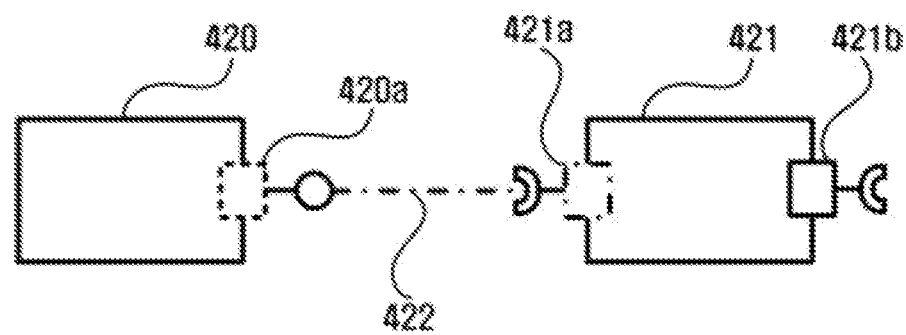

FIG. 4B is a diagram showing an example where the user explicitly deletes a provide interface. FIG. 4B is different from FIG. 4A in that there are two require interfaces.

For explanatory convenience, an interface 421a that is located on a left side of a require component 421 is referred to as a first require interface, and an interface 421b that is located on a right side thereof is referred to as a second require interface.

If the user explicitly deletes a provide interface 420a, a connection 422 becomes insignificant and is then deleted, and the require interface 421a associated with the connection 422 is also deleted.

At this time, the second require interface 421b and the require component 421 are not deleted. This is because a provide interface (not shown) of a different provide component (not shown) and the second require interface 421b may be associated with each other.

Figure 4C:
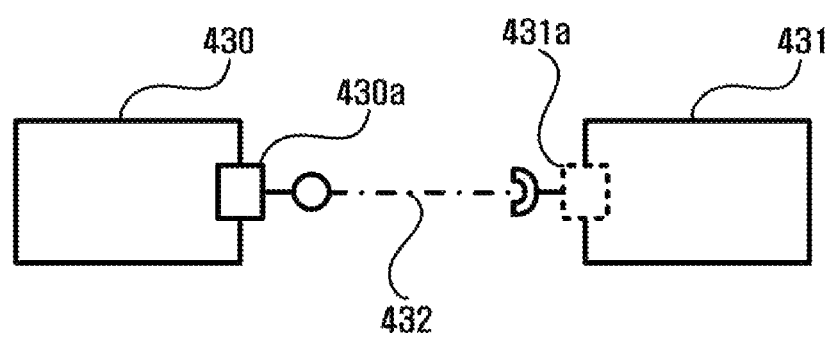

FIG. 4C shows an example where, when the user explicitly deletes a require interface 431a, a connection 432 becomes insignificant and is then deleted.

At this time, a provide interface 430a and a provide component 430 are not affected even if the connection 432 is deleted. This is because the provide component 430 and the provide interface 430a are elements that provide functions, unlike the require component 431 and the require interface 431a, and thus they are associated with a require interface (not shown) of a different require component (not shown) to provide their functions.

Figure 4D:
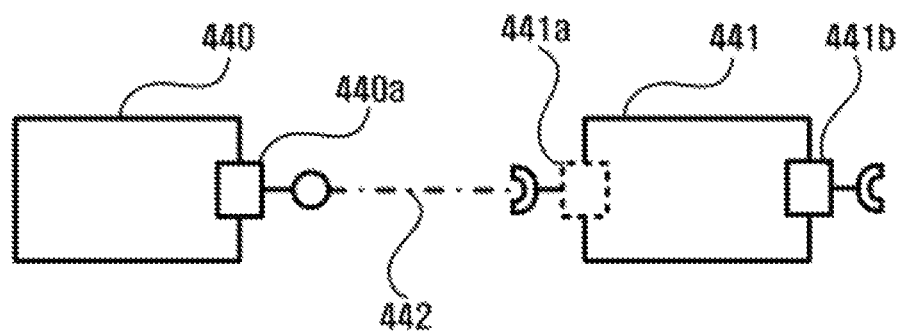

FIG. 4D shows an example where the user explicitly deletes a require interface 441a. FIG. 4D is different from FIG. 4C in that there are two require interfaces.

For explanatory convenience, an interface 441a that is located on a left side of a require component 441 is referred to as a first require interface, and an interface 441b that is located on a right side thereof is referred to as a second require interface.

If the user explicitly deletes the first require interface 441a, a connection 442 becomes insignificant and is deleted.

At this time, the second require interface 441b and the require component 441 are not deleted. This is because a provide interface (not shown) of a different provide component (not shown) and the second require interface 441b may be associated with each other.

Figure 5A:
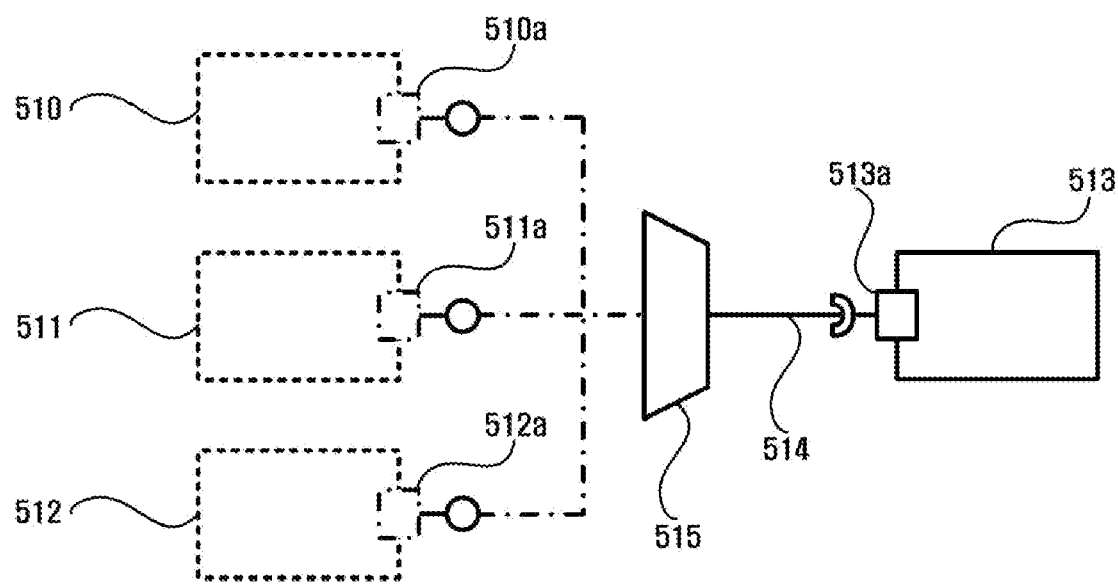
FIGS. 5A and 5B are diagrams showing a case where implicit variability rules are applied to an alternative component, according to an exemplary embodiment of the present invention.
Figure 5B:
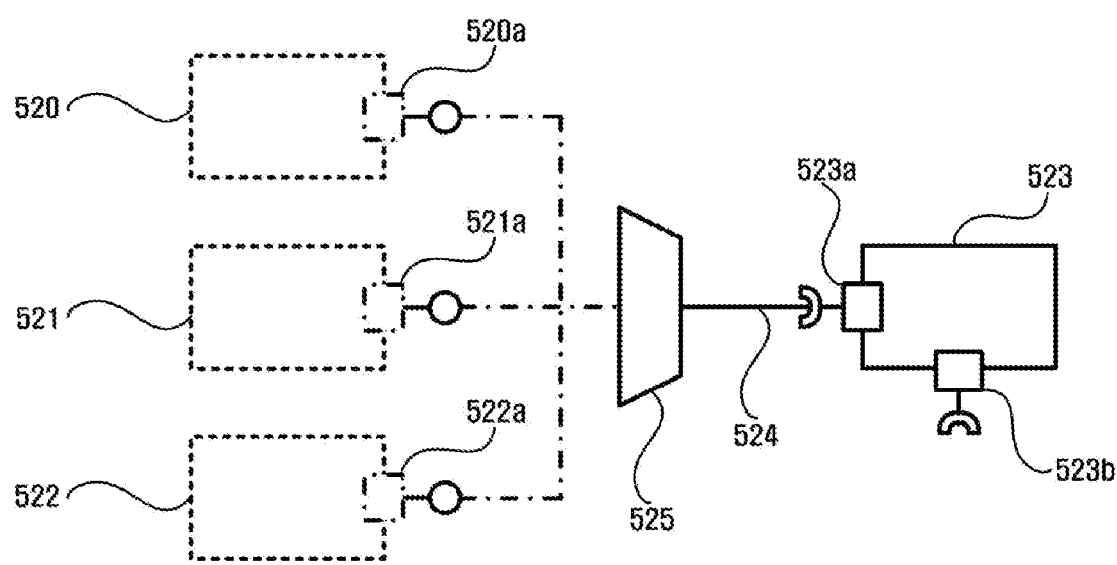

FIGS. 5A and 5B are diagrams showing a case where implicit variability rules are applied to an alternative component, according to an exemplary embodiment of the present invention. There are three provide components (510, 511, 512 and 520, 521, 522) that provide specific functions, and one require component (513 and 523) that uses the functions provided by the provide components. In addition, an interface (510a, 511a, 512a, 520a, 521a, and 522a) exists in each component, and the interfaces are associated with connections (514 and 524).

According to the implicit variability rules of the present invention, "Alternative" setting is commonly performed for a plurality of associated component model elements. In this case, when the variability is represented by grouping elements, which are affected by the same configuration variable setting, only one element is selected.

For reference, trapezoidal notations 515 and 525 indicate that three components are affected by the same configuration variable setting.

Referring to FIG. 5A, when the user explicitly restricts a specific function, which is affected by the same configuration variable setting, in three components 510, 511, and 512, provide interfaces 510a, 511a, and 512a of each component are affected by the user's explicit restriction. In addition, connection 514 associated with each component are also affected by the user's explicit restriction.

For reference, in FIGS. 2A to 4D, a case where a component model element is deleted has been described as an example of the user's explicit restriction.

At this time, as described above, an "Alternative" setting is commonly performed for a plurality of associated component model elements. In addition, when the variability is represented by grouping the elements, which are affected by the same configuration variable setting, only one element is selected, that is, one of the three provide components 510, 511, and 512 is inevitably selected. Therefore, a require interface 513a and a require component 513 are not affected by the user's explicit restriction.

Accordingly, as shown in FIG. 5A, the three provide components 510, 511, and 512 and the require component 513 are always associated with each other by a connection 514.

FIG. 5B is a diagram showing an example where a require component 523 is provided with a require interface 523b in addition to a require interface 523a, in addition to the example shown in FIG. 5A. That is, the same description as FIG. 5A is given, except that the number of interfaces (520a, 521a, 522a, 523a, 523b) is different.

Figure 6A:
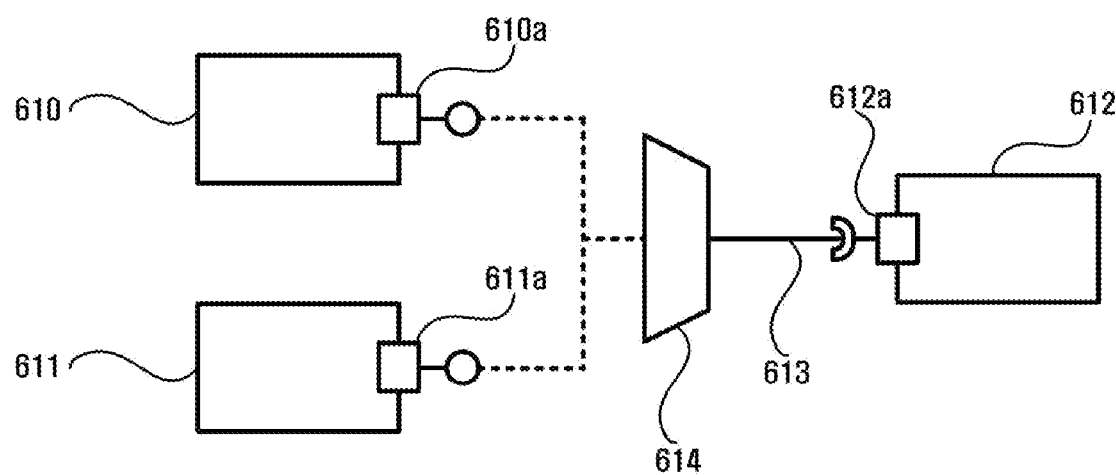
FIGS. 6A and 6B are diagrams showing a case where implicit variability rules are applied to an alternative connection, according to an exemplary embodiment of the present invention.
Figure 6B:
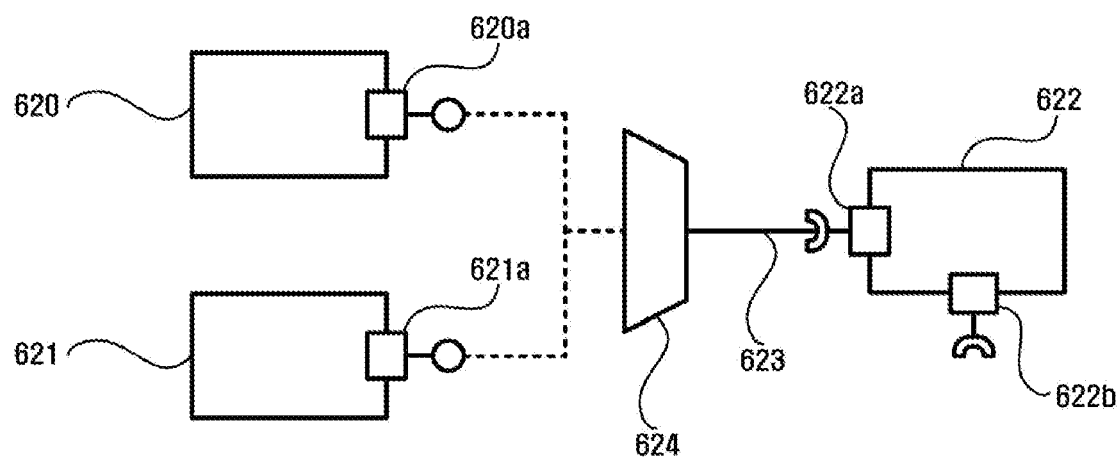

FIGS. 6A and 6B are diagrams showing a case where implicit variability rules are applied to "Alternative" connection, according to an exemplary embodiment of the present invention. There are two provide components (610, 611 and 620, 621) that provide specific functions and one require component (612 and 622) that uses the functions provided by the provide components. An interface (610a, 611a, 612a, 620a, 621a and 622a) exists in each component, and the interfaces are associated with each other by connections (613 and 623).

For reference, trapezoidal notations 614 and 624 indicate that two connections are affected by the same configuration variable setting.

Although FIG. 6A seems to be similar to FIG. 5A, FIG. 5A shows a case where the user's explicit restriction is applied to a component, while FIG. 6A shows a case where the user's explicit restriction is applied to a connection.

Accordingly, in case of the "Alternative" connection, one connection is inevitably selected, and provide components 610 and 611 and a require component 612 are always associated with each other by connections.

FIG. 6B is a diagram showing an example where a require interface 622b is additionally provided in the require component 622, in addition to the example shown in FIG. 6A. That is, the same description as FIG. 6A is given, except that the number of interfaces is different.

FIGS. 7A to 7F are diagrams showing a case where implicit variability rules are applied to the "Alternative" interface, according to an exemplary embodiment of the present invention. There is one provide component (710, 720, 730, 740, 750 and 760) that provides a specific function and at least one require component (711, 721, 731, 732, 741, 742, 751 and 761) that uses the function provided by the provide component. In addition, at least one interface exists in each component, and the interfaces are associated with each other by connections (712, 722, 733, 734, 743, 744, 752, 753, 762 and 763).

For reference, a trapezoidal notation indicates that two interfaces are affected by the same configuration variable setting.

For explanatory convenience, a first interface in an upper vertical direction of two provide interfaces is referred to as a first provide interface, and a second interface is referred to as a second provide interface.

Figure 7A:
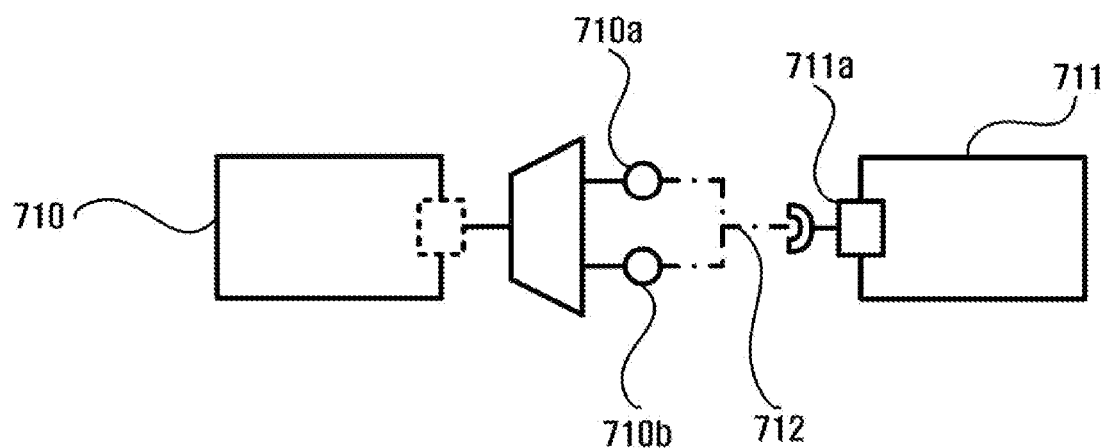
FIGS. 7A to 7F are diagrams showing a case where implicit variability rules are applied to an alternative interface, according to an exemplary embodiment of the present invention.

FIG. 7A is a diagram showing an example where the user's explicit restriction is applied to provide interfaces 710a and 710b. When the user's explicit restriction is applied to the provide interfaces 710a and 710b, a connection 712 associated with the provide interfaces 710a and 710b is also affected. In case of the "Alternative" interface, however, one interface is inevitably selected.

Accordingly, a require interface 711a is always associated with one of the first provide interface 710a and the second provide interface 710b by the connection 712. As a result, the require interface 711a is not affected by the user's explicit restriction, which is applied to the provide interfaces 710a and 710b.

Figure 7B:
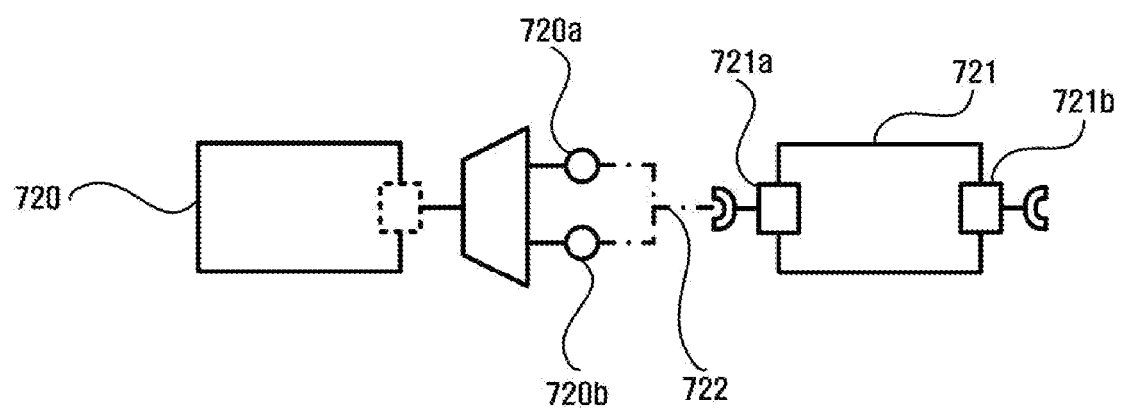

FIG. 7B is a diagram showing an example where a require interface 721b is additionally provided in a require component 721, in addition to the example shown in FIG. 7A. That is, the same description as FIG. 7A is given, except that the number of interfaces (720a, 720b, 721a and 721b) is different.

Figure 7C:
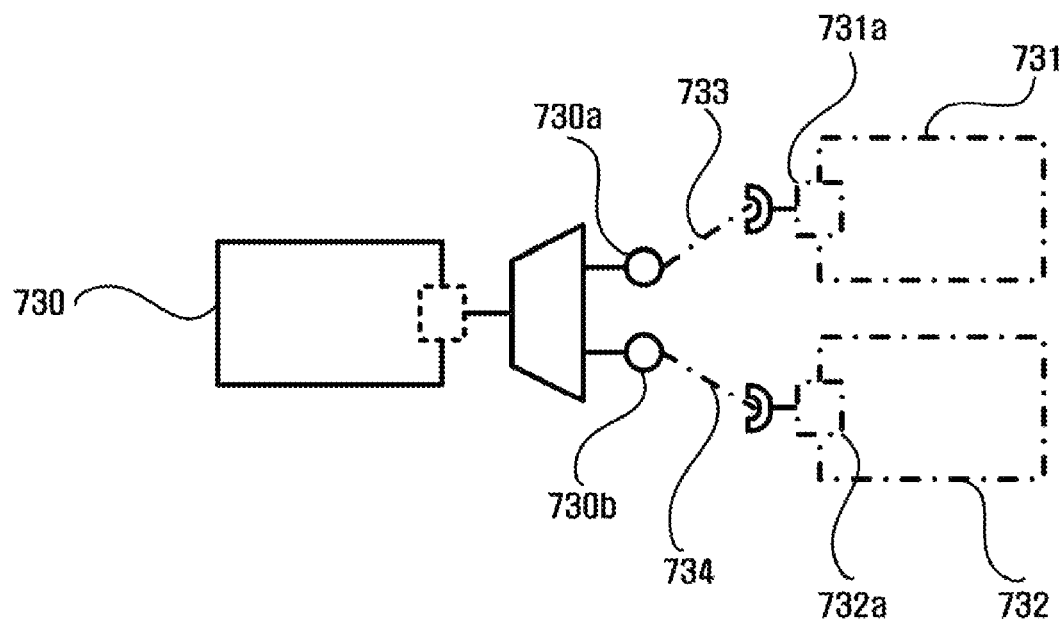

FIG. 7C is a diagram showing an example where require interfaces 731a and 732a of require components 731 and 732 are associated with provide interfaces 730a and 730b by connections 733 and 734, respectively, in addition to the example shown in FIG. 7A.

From a different viewpoint, the require interfaces 731a and 732a are associated with the provide interfaces 730a and 730b by the connections 733 and 734, respectively. Accordingly, as shown in FIG. 4A, the connections 733 and 734 are affected by the user's explicit restriction, which is applied to the provide interfaces 730a and 730b, and the require interfaces 731a and 732a and the require components 731 and 732 are affected by the connections 733 and 734.

In case of the "Alternative" interface, one interface is inevitably selected. Accordingly, in FIG. 7C, the second provide interface 730b is selected and associated with the require interface 732a by the connection 734.

Figure 7D:
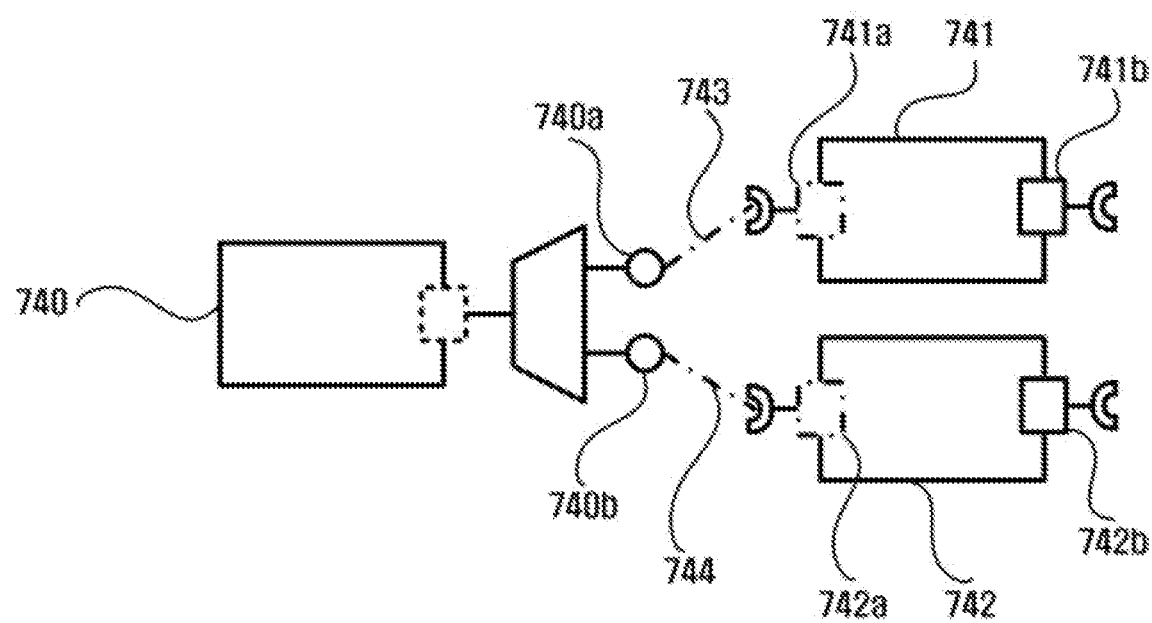

FIG. 7D is a diagram showing an example where require interfaces 741b and 742b are additionally provided in require components 741 and 742, respectively, in addition to the example shown in FIG. 7C.

For explanatory convenience, the interfaces 741a and 742a that are located on left sides of the require components 741 and 742 are referred to as first require interfaces, and the interfaces 741b and 742b that are located on right sides thereof are referred to as second require interfaces.

The additional second require interfaces 741b and 742b may be associated with a provide interface (not shown) of a different provide component (not shown). Therefore, unlike FIG. 7C, only the first require interfaces 741a and 742a are affected by the user's explicit restriction, while the require components 741 and 742 are not affected.

Figure 7E:
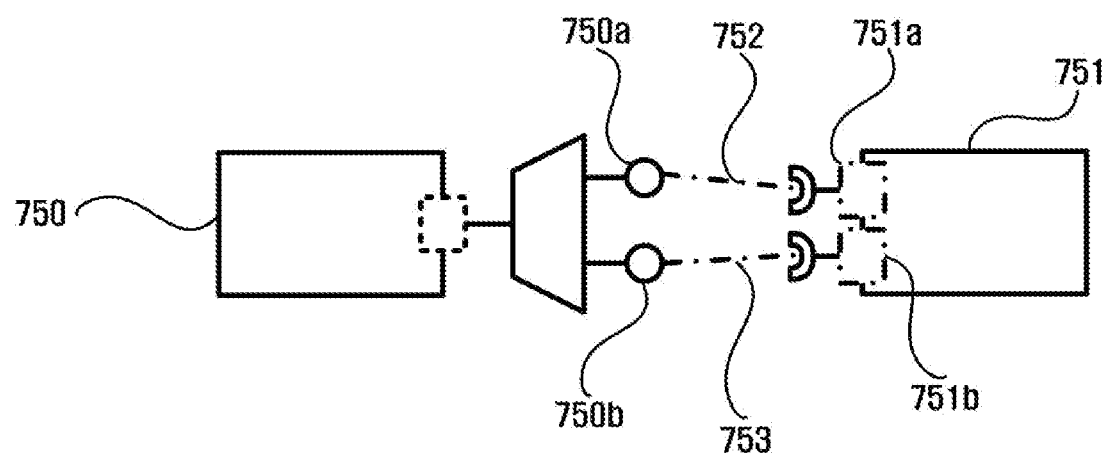

FIG. 7E is a diagram showing an example where one or more require interfaces 751a and 751b is selectively associated with one or more provide interfaces 750a and 750b, in addition to the example shown in FIG. 7A.

The first require interfaces 721a, 741a, and 742a and the second require interfaces 721b, 741b, and 742b shown in FIGS. 7B and 7D may be associated with provide interfaces (not shown) of other provide components (not shown). Meanwhile, the require interfaces 751a and 751b shown in FIG. 7E may be selectively associated with the interfaces 750a and 750b of the same provide component 750.

Figure 7F:
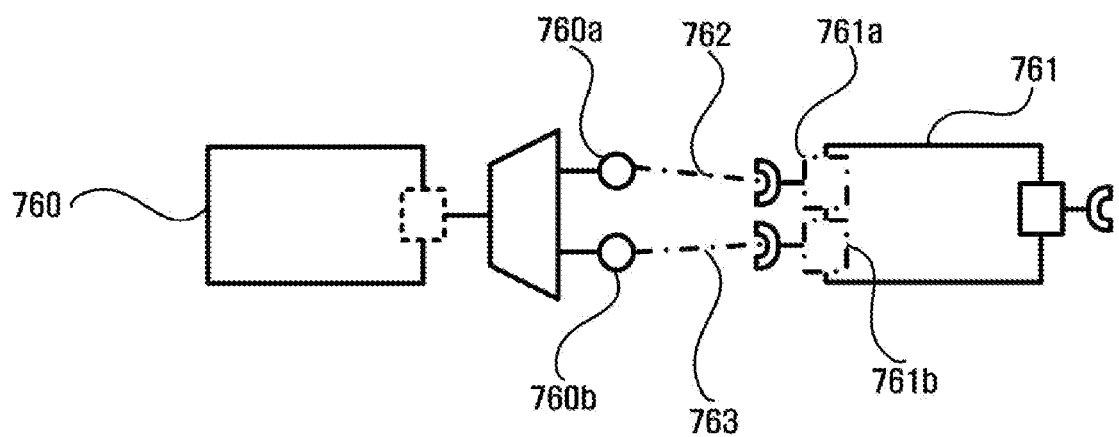

FIG. 7F is a diagram showing an example where a require interface 761c is additionally provided in a require component 761, in addition to the example shown in FIG. 7D. That is, the same description as FIG. 7E is given, except that the number of interfaces is different.

At this time, the additional require interface 761c may be associated with a provide interface (not shown) of a different provide component (not shown).

Figure 8A:
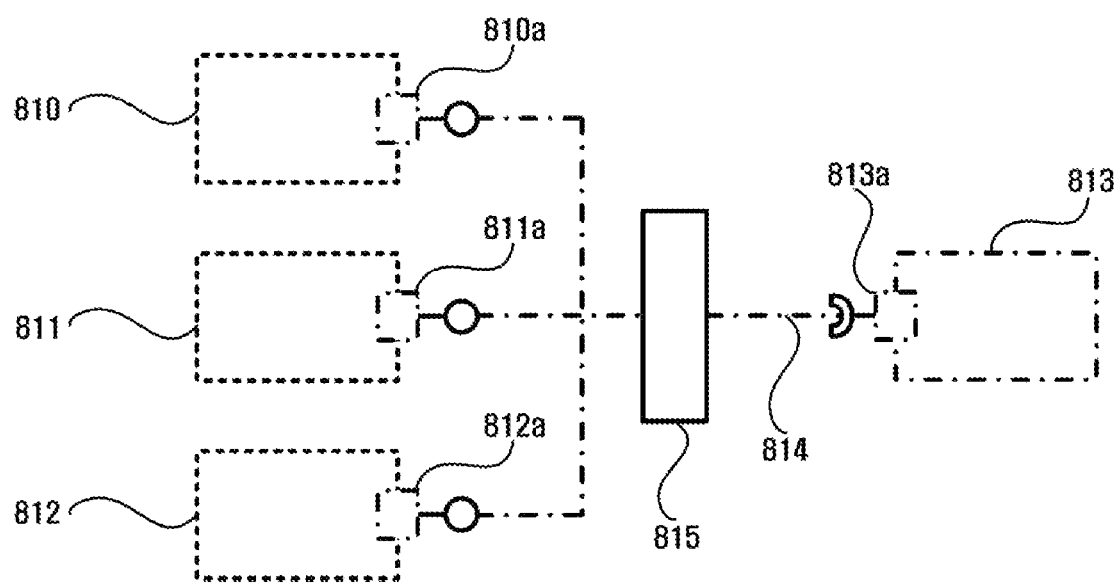
FIGS. 8A and 8B are diagrams showing a case where implicit variability rules are applied to a selective component, according to an exemplary embodiment of the present invention.
Figure 8B:
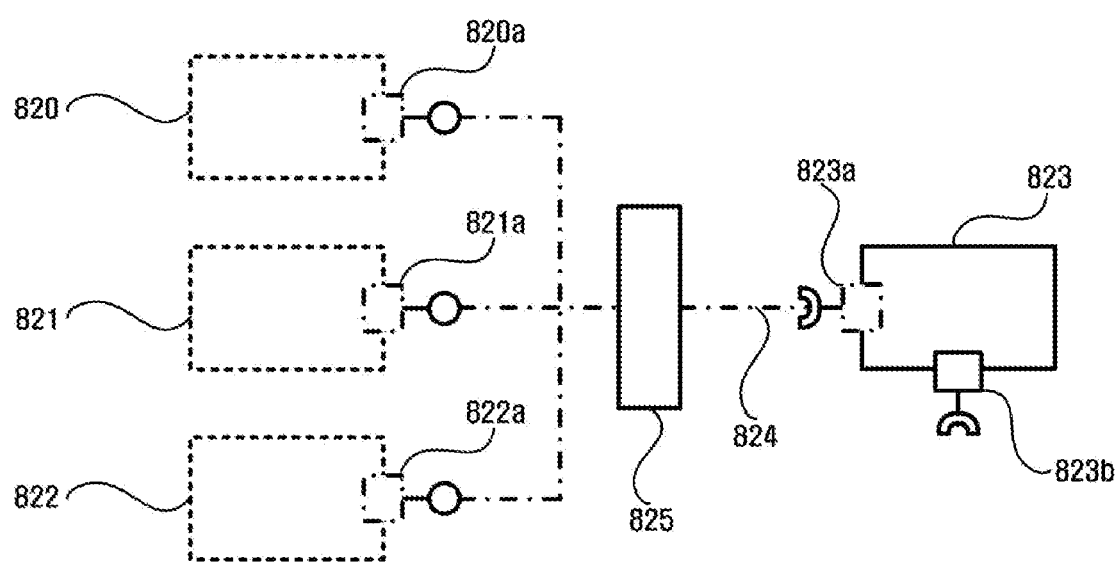

FIGS. 8A and 8B are diagrams showing a case where implicit variability rules are applied to a "Selective" component, according to an exemplary embodiment of the present invention. There are three provide components (810, 811, 812 and 820, 821, 822) that provide specific functions and one require component (813 and 823) that uses the functions provided by the provide components. In addition, an interface (810*a*, 811*a*, 812*a*, 813*a*, 820*a*, 821*a*, 822*a*, 823*a*, 823*b*) exists in each component, and the interfaces are associated with each other by connections (814 and 824).

According to the implicit variability rules of the present invention, "Selective" setting is similar to the "Alternative" setting in that it is commonly applied to a plurality of associated component model elements. The "Selective" setting is different from the "Alternative" setting in that, when the variability is represented by grouping the elements, which are affected by the same configuration variable setting, one or more elements may be selected.

That is, no element may be selected or a plurality of elements may be selected.

For reference, in FIGS. 8A and 8B, a rectangular notation 815 and 825 indicates that three provide components 810, 811, 812 and 820, 821 and 822 are affected by the same configuration variable setting.

As shown in FIG. 8A, when the user explicitly restricts a specific function, which is affected by the same configuration variable setting, in the three provide components 810, 811, and 812, provide interfaces 810*a*, 811*a*, and 812*a* of each component are affected by the user's explicit restriction, and a connection 814 associated with each component are also affected by the user's explicit restriction.

For reference, in FIGS. 2A to 4D, a case where a component model element is deleted has been described as an example of the user's explicit restriction.

At this time, as described above, the "Selective" setting is commonly performed for a plurality of associated component model elements. In addition, when the variability is represented by grouping the elements, which are affected by the same configuration variable setting, no element may be selected or a plurality of elements may be selected. Accordingly, referring to FIG. 8A, the user's explicit restriction that is applied to the three provide components 810, 811, and 812 may affect the connection 814, the require interface 813*a*, and the require component 813.

Therefore, as shown in FIG. 8A, the connection 814, the require interface 813*a*, and the require component 813 are all indicated by dotted lines.

FIG. 8B is a diagram showing an example where a require interface 823*b* is provided in addition to a require interface 823*a* in a require component 823, in addition to the example shown in FIG. 8A. That is, the same description as FIG. 8A is given, except that the number of require interfaces is different.

At this time, the require component 823 is indicated by a solid line to represent that it is not affected by the user's explicit restriction. This is because the additional require interface 823*b* may be associated with a provide interface (not shown) of a different provide component (not shown).

Figure 9A:
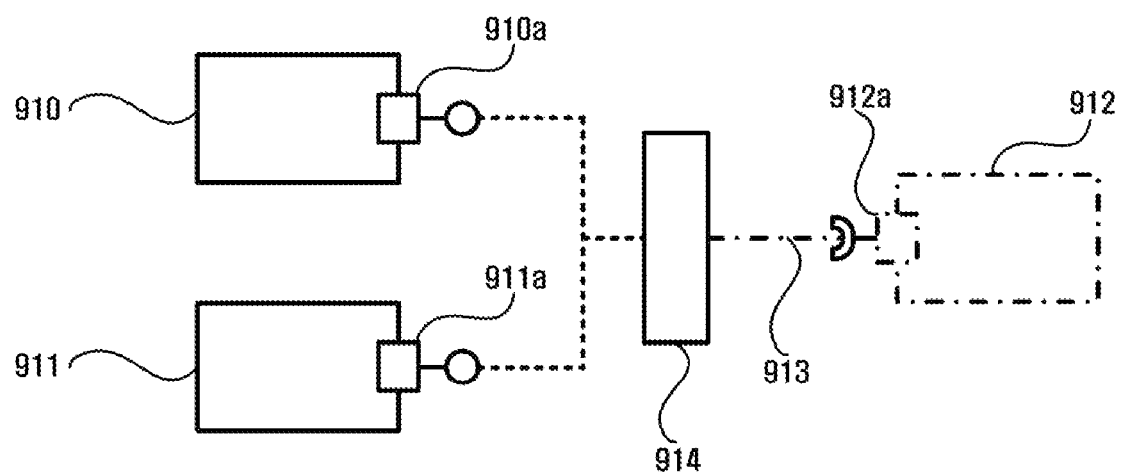
FIGS. 9A and 9B are diagrams showing a case where implicit variability rules are applied to a selective connection, according to an exemplary embodiment of the present invention.
Figure 9B:
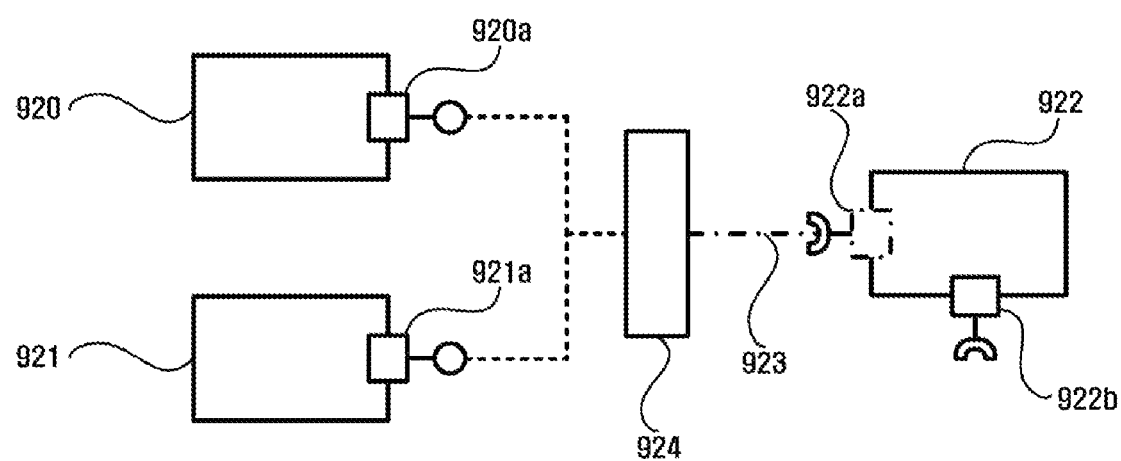

FIGS. 9A and 9B are diagrams showing an example where implicit variability rules are applied to the "Selective" connection, according to an exemplary embodiment of the present invention. There are two provide components (910, 911 and 920, 921) that provide specific functions and one require component (912 and 922) that uses the functions provided by the provide components. In addition, an interface exists (910*a*, 911*a*, 912*a*, 920*a*, 921*a*, 922*a* and 922*b*) in each component, and the interfaces are associated with each other by connections (913 and 923).

For reference, rectangular notations 914 and 924 indicate that two connections are affected by the same configuration variable setting.

As described above, in case of the "Selective" connection, no element may be selected or a plurality of elements may be selected. Accordingly, a require interface 912*a* and a require component 912 are both affected by the user's explicit restriction, which is applied to the connection.

FIG. 9B is a diagram showing an example where a require interface 922*b* is additionally provided in a require component 922, in addition to the example shown in FIG. 9A. That is, the same description as FIG. 9A is given, except that the number of interfaces is different.

At this time, the require component 922 is indicated by a solid line to represent that it is not affected by the user's explicit restriction. This is because the additional require interface 922*b* may be associated with a provide interface (not shown) of a different provide component (not shown).

FIGS. 10A to 10F are diagrams showing a case where implicit variability rules are applied to "Selective" interface, according to an exemplary embodiment of the present invention. There are one provide component (1010, 1020, 1030, 1040, 1050 and 1060) that provides a specific function, at least one provide interface (1010*a*, 1010*b*, 1020*a*, 1020*b*, 1030*a*, 1040*a*, 1040*b*, 1050*a*, 1050*b*, 1060*a* and 1060*b*), at least one require component (1011, 1021, 1031, 1032, 1041, 1042, 1051 and 1061) that uses the function provided by the provide component, and at least on require interface (1011*a*, 1021*a*, 1021*b*, 1031*a*, 1032*a*, 1041*a*, 1042*a*, 1051*a*, 1051*b*, 1061*a* and 1061*b*). In addition, the interfaces are associated with each other by connections (1012, 1022, 1033, 1034, 1043, 1044, 1052, 1053, 1062 and 1063).

For reference, a rectangular notation indicated that two interfaces are affected by the same configuration variable setting.

For explanatory convenience, a first interface in a vertical direction of two provide interfaces is referred to as a first provide interface, and a second interface is referred to as a second provide interface.

Figure 10A:
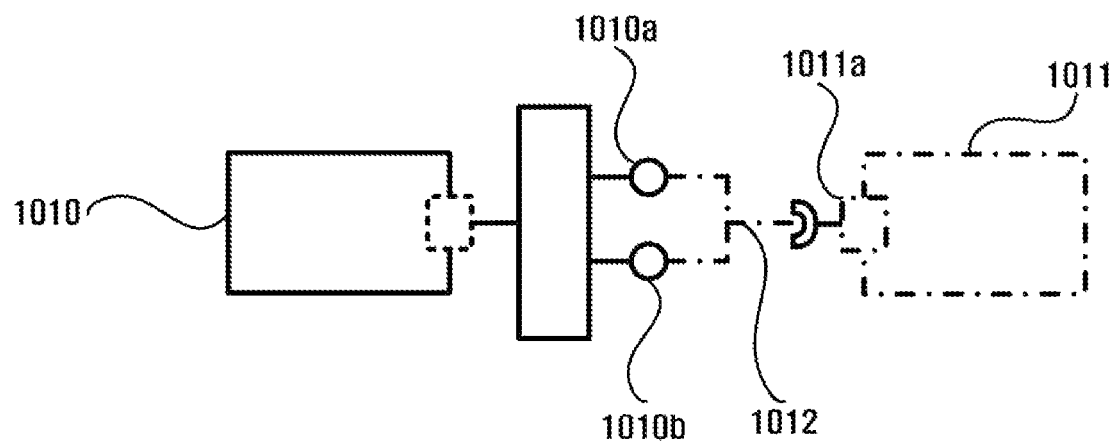
FIGS. 10A to 10F are diagrams showing a case where implicit variability rules are applied to a selective interface, according to an exemplary embodiment of the present invention.

FIG. 10A is a diagram showing an example where the user's explicit restriction is applied to provide interfaces 1010*a* and 1010*b*. When the user's explicit restriction is selectively applied to the provide interfaces 1010*a* and 1010*b*, no element may be selected or a plurality of elements may be selected. That is, a connection 1012, a require interface 1011*a*, and a require component 1011 may all be affected.

Figure 10B:
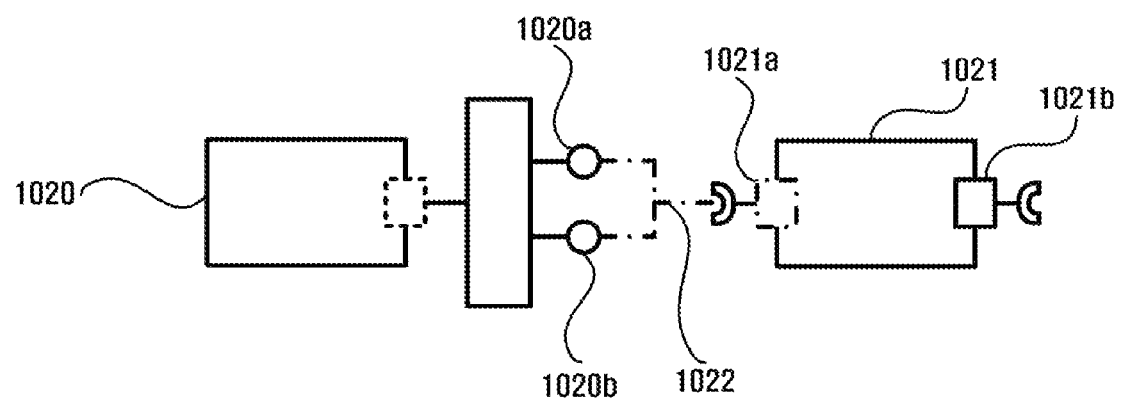

FIG. 10B is a diagram showing an example where a require interface 1021*b* is provided in addition to a require interface 1021*a* in a require component 1021, in addition to the example shown in FIG. 10A. That is, the same description as FIG. 10A is given, except that the number of interfaces is different.

At this time, the require component 1021 is indicated by a solid line to represent that it is not affected by the user's explicit restriction. This is because the additional require interface 1021*b* may be associated with a provide interface (not shown) of a different provide component (not shown).

Figure 10C:
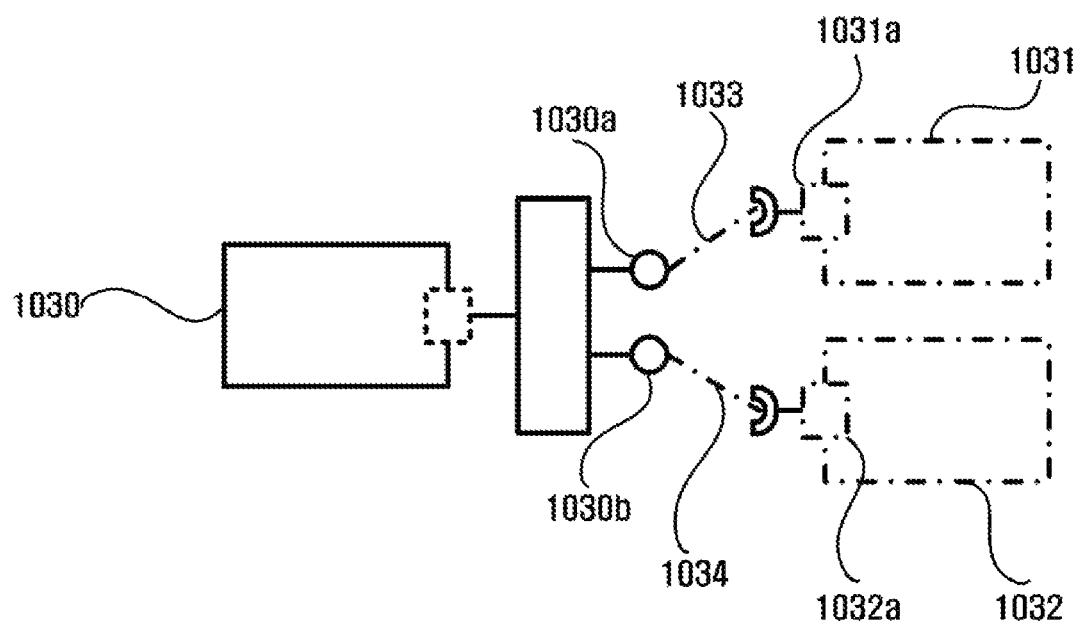

FIG. 10C is a diagram showing an example where require interfaces 1031*a* and 1032*a* are associated with provide interfaces 1030*a* and 1030*b* by connections 1033 and 1034, respectively, in addition to the example shown in FIG. 10A.

From a different viewpoint, the require interfaces 1031*a* and 1032*a* are associated with the provide interfaces 1030*a* and 1030*b* by additional connections 1033 and 1034, respectively. In case of the "Selective" interface, no element may be selected or a plurality of elements may be selected. Accordingly, the connections 1033 and 1034 are affected by the user's explicit restriction, which is applied to the provide interfaces 1030*a* and 1030*b*, and the require interfaces 1031*a* and 1032*a* and the require components 1031 and 1032 are affected by the connections 1033 and 1034.

Figure 10D:
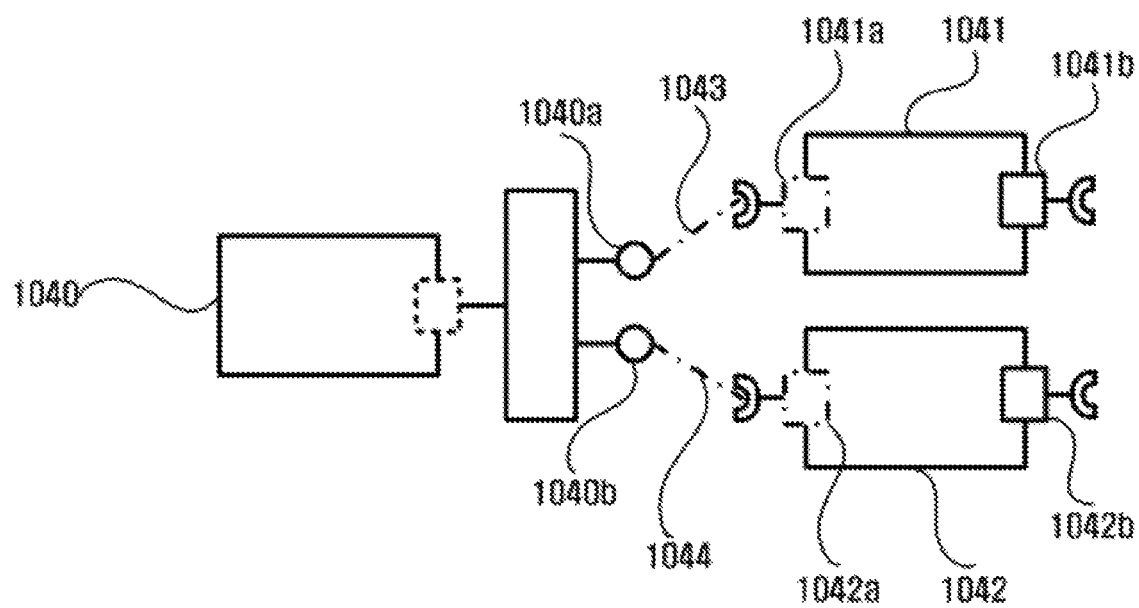

FIG. 10D is a diagram showing an example where require interfaces 1041*b* and 1042*b* are additionally provided in require components 1041 and 1042, respectively.

For explanatory convenience, the interfaces 1041*a* and 1042*a* that are located on left sides of the require components 1041 and 1042 are referred to as first require interfaces, and the interfaces 1041*b* and 1042*b* that are located on right sides thereof are referred to as second require interfaces.

The additional second require interfaces 1041*b* and 1042*b* may be associated with a provide interface (not shown) of a different provide component (not shown). Accordingly, unlike FIG. 10C, only the first require interfaces 1041*a* and 1042*a* are affected by the user's explicit restriction, while the require components 1041 and 1042 are not affected.

Figure 10E:
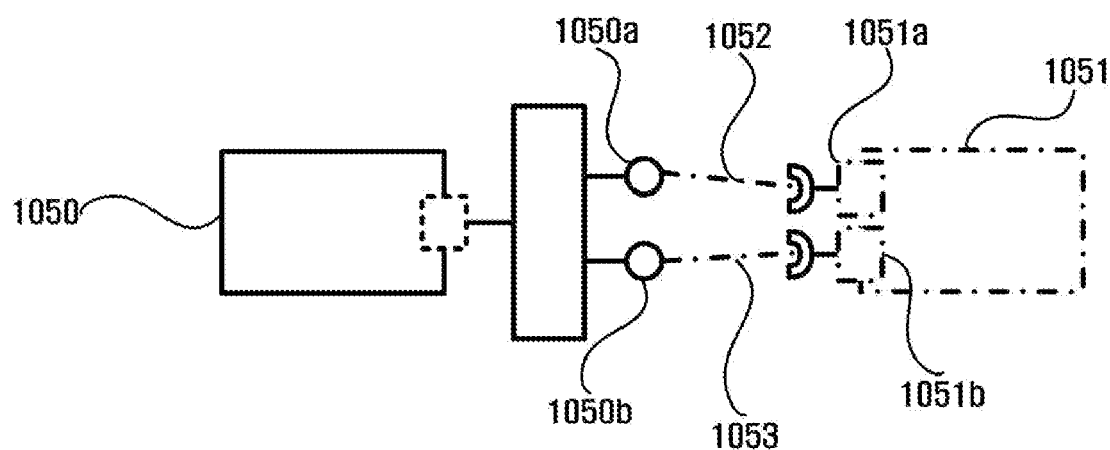

FIG. 10E shows that one or more require interfaces 1051*a* and 1051*b* may be selectively associated with one or more provide interfaces 1050*a* and 1050*b* in the same manner as FIG. 10A.

The first require interfaces 1021*a*, 1041*a*, and 1042*a* and the second require interfaces 1021*b*, 1041*b*, and 1042*b* shown in FIGS. 10B and 10D may be associated with provide interfaces (not shown) of other provide components (not shown), respectively. The require interfaces 1051*a* and 1051*b* shown in FIG. 10E may be selectively associated with the interfaces 1050*a* and 1050*b* of the same provide component 1050. In case of the "Selective interface", no element may be selected or a plurality of elements may be selected. Accordingly, unlike FIG. 7E, the require component 1051 is also affected by the user's explicit restriction.

Figure 10F:
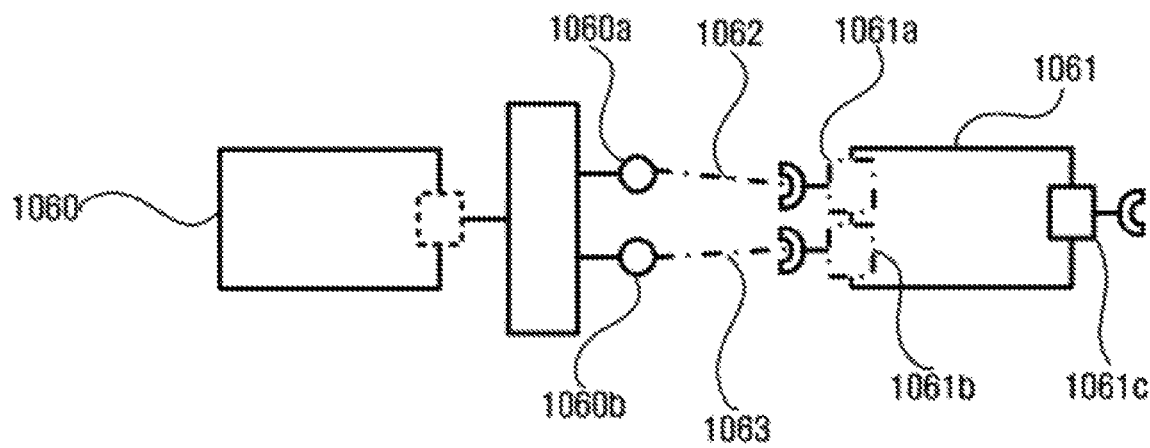

FIG. 10F is a diagram showing an example where a require interface 1061*c* is additionally provided in a require component 1061, in addition to the example shown in FIG. 10E. That is, the same description as FIG. 10E is given, except that the number of interfaces is different.

At this time, the additional require interface 1061*c* may be associated with a provide interface (not shown) of a different provide component (not shown), and thus the require component 1061 is not affected by the user's explicit restriction.

FIGS. 11A through 11F are diagrams showing examples of descriptions that are represented by a component-description language-processing unit according to an exemplary embodiment of the present invention, and corresponding elements.

Figure 11E:
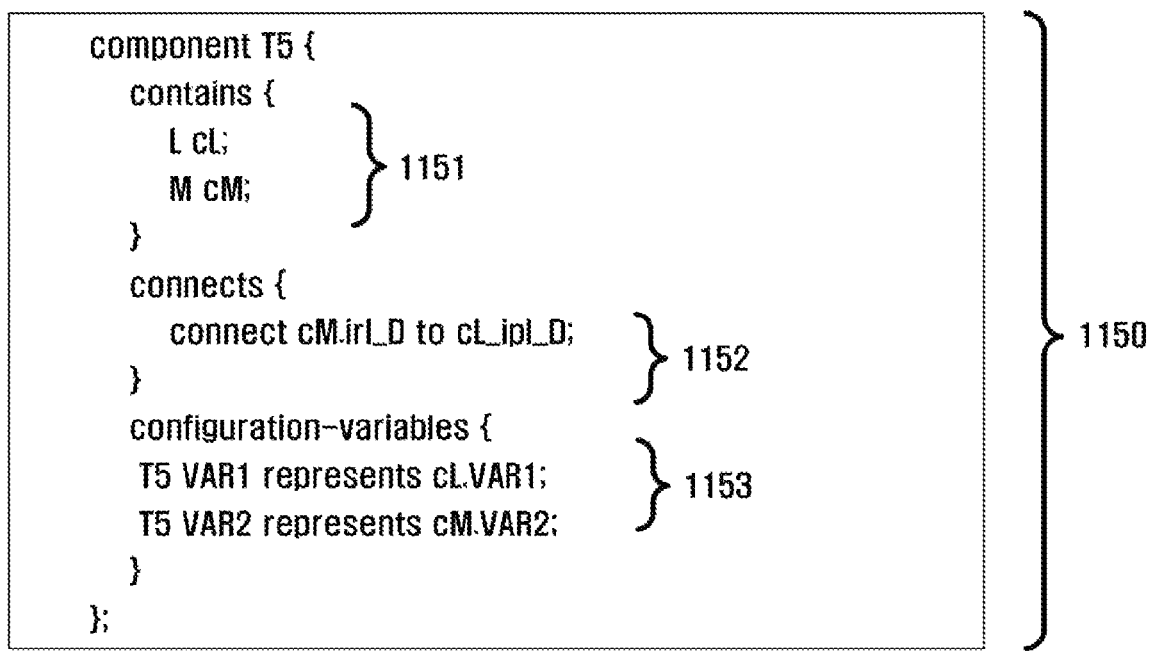
Figure 11F:
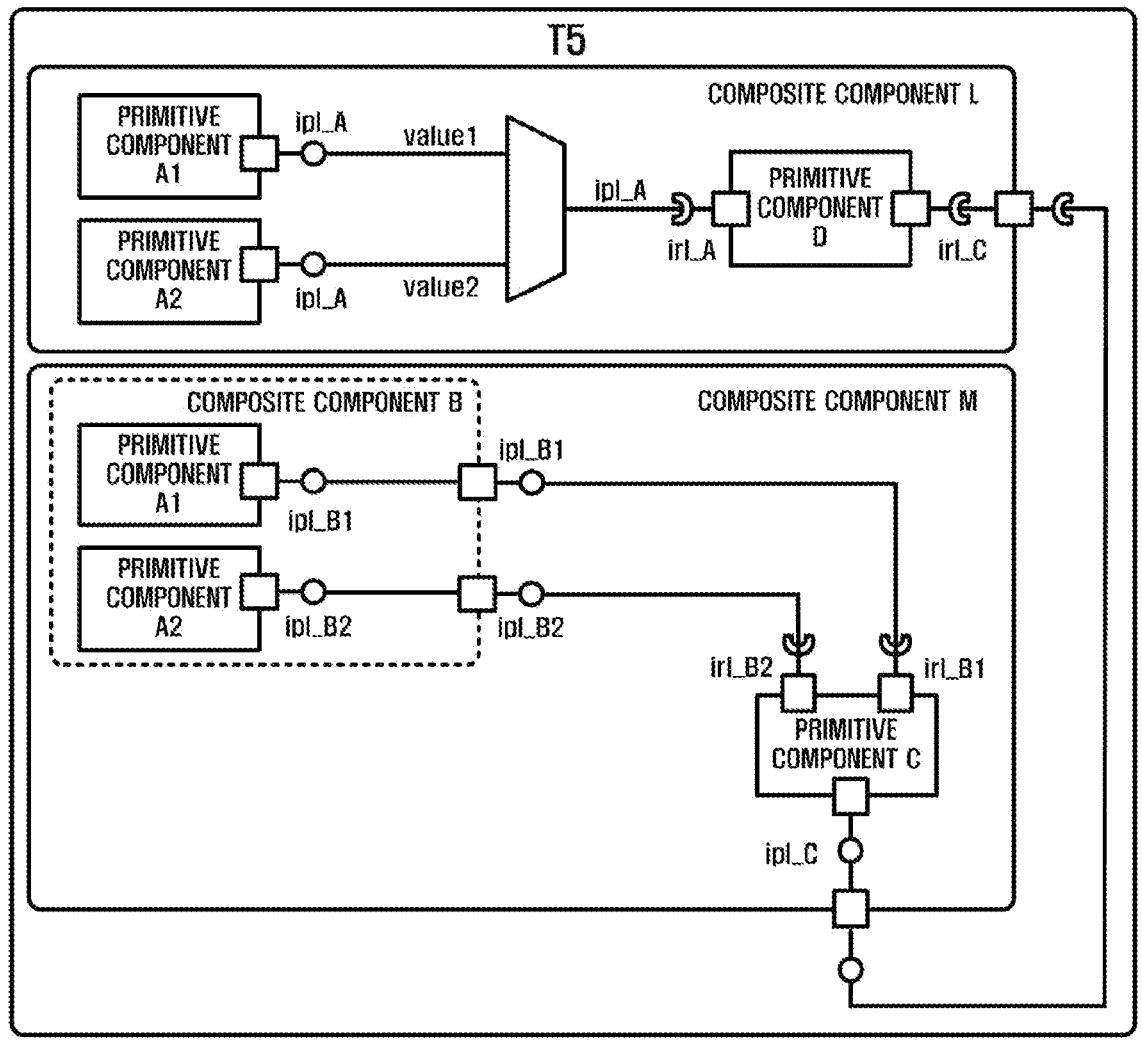

FIG. 11F shows a primitive component that does not include any element, a composite component that includes at least one primitive component, and a root composite component as a top composite component that includes at least one primitive component and at least one sub composite component.

As shown in FIG. 11A, from a description 1110 of a primitive component, it can be seen that primitive components A1, A2, B1, and B2 provide specific functions through provide interfaces.

For reference, "ip1" is used as the prefix of the provide interface, and "ir1" is used as the prefix of the require interface.

In addition, as shown in FIG. 11B, from a description 1120 of a composite component B, it can be seen that the composite component B includes primitive components B1 and B2 (1121) and provides specific functions through provide interfaces ip1_B1 and ip1_B2 (1122). At this time, the provide interfaces ip1_B1 and ip1_B2 are delegated from the provide components B1 and B2 (1123).

As shown in FIG. 11C, from a description 1130 of a composite component L, it can be seen that the composite component L includes primitive components A1, A2, and D (1131), and requires a specific function through a require interface ir1_C (1132). At this time, the require interface ir1_C is delegated from the primitive component D (1134).

A require interface ir1_A of the component D requires one of the provide interfaces ip1_A1 and ip1_A2 of the primitive components A1 and A2, and then a connection is made between the require interface and the required provide interface (1133). In addition, it can be seen that the variables of the composite component L are set (1135).

For reference, a trapezoidal notation shown in FIG. 11F indicates a switch function that outputs one of input values.

As shown in FIG. 11D, from a description 1140 of a composite component M, it can be seen that the composite component M includes a composite component B and a primitive component C (1141). At this time, the composite component M that includes the composite component B defines the variables of the composite component B to determine whether to include the composite component B (1141*a*).

As shown in FIG. 11F, the composite component B is indicated by a dotted line to represent that it may be included in the composite component M.

Subsequently, as shown in FIG. 11D, from a description 1140 of the composite component M, it can be seen that provide interfaces ip1_B1 and ip1_B2 of the composite component B are associated with the require interfaces ir1_B1 and ir1_B2 of the primitive component C by connections (1143). At this time, a provide interface ip1_C of the composite component M is delegated from the primitive component C (1142). In addition, it can be seen that the variables of the composite component M, that is, the values about whether to include the composite component B are set (1144).

Finally, as shown in FIG. 11E, from a description 1150 of a root composite component T5, it can be seen that the root composite component T5 includes composite components L and M (1151), and the composite components L and M are associated with a provide interface of the composite component M and a require interface of the composite component L by connections (1152), respectively. In addition, it can be seen that the settings of the variables in each component are delegated to a parent component of the composite components L and M, that is, the root composite component T5 (1153).

Therefore, if the user applies the settings of the variables delegated from the composite components L and M in the root composite component T5, the settings are applied to all of the sub elements in the root composite component T5.

FIGS. 12A to 12E are diagrams showing examples of descriptions that are represented by the component-description language-processing unit 110 according to another exemplary embodiment of the present invention, and corresponding elements.

For reference, in the exemplary embodiment of the present invention, it is assumed that, as the user's explicit restriction, "Option" is applied to determine whether to include an element according to the conditions.

Figure 12A:
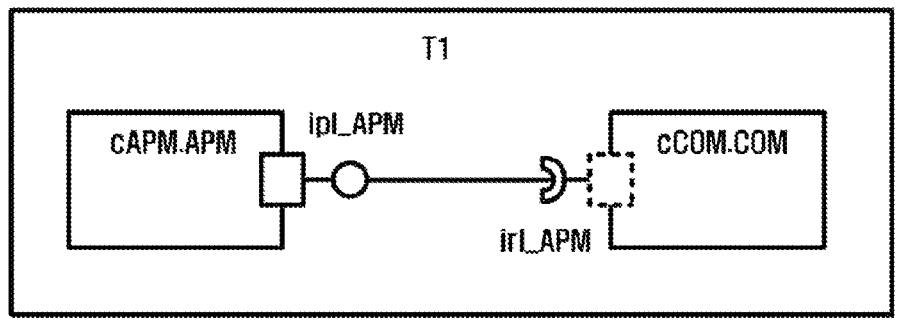
FIGS. 12A to 12E are diagrams showing examples of descriptions that are represented by a component-description language-processing unit according to another exemplary embodiment of the present invention, and corresponding elements.

First, from FIG. 12A, it can be seen that a composite component T1 includes primitive components APM and COM (1211), and a provide interface 1213 of the primitive component APM and a require interface 1214 of the primitive component COM are associated with the primitive components APM and COM respectably by a connection (1212).

At this time, an option has already been applied to the require interface of the primitive component COM (1212), and the primitive component COM sets the corresponding value (1215)

Figure 12B:
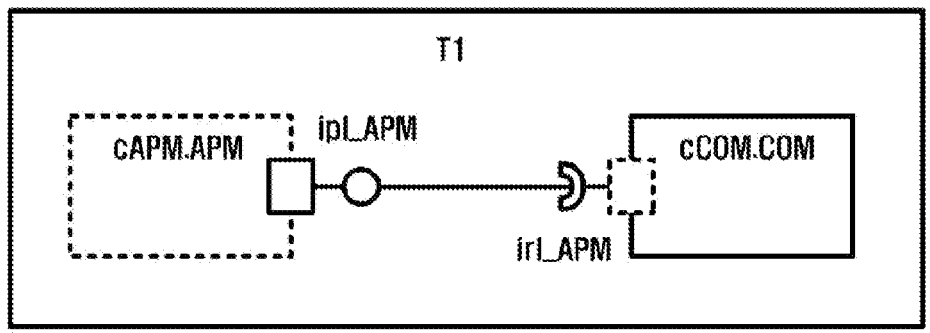

Next, from a description 1220 shown in FIG. 12B, it can be seen that, when the user deletes the option of the primitive component APM, that is, the corresponding component, in the description of the composite component T1 as a parent component of the primitive component APM, the options and the variables of the primitive component APM are defined (1221), and also the values of the variables are set (1222).

Figure 12C:
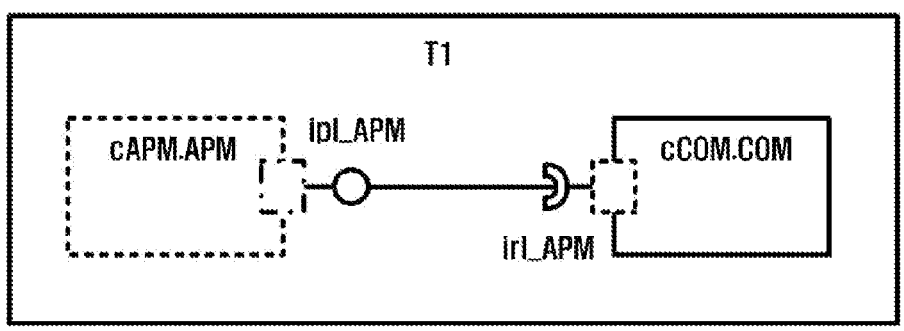

Next, from a description 1230 shown in FIG. 12C, it can be seen that the user's explicit restriction, which is applied to the primitive component APM, is also applied to the provide interface of the primitive component APM (1231).

That is, if the primitive component APM is deleted, the provide interface of the primitive component APM is also deleted.

In the description of the primitive component APM, the options and the variables of the provide interface are defined, and also the values of the variables are set (1232).

Figure 12D:
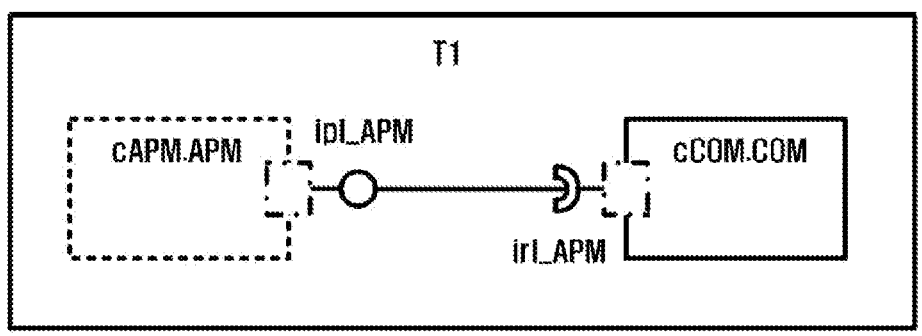

Next, from a description 1240 shown in FIG. 12D, it can be seen that, in case of the primitive component COM, since the user's explicit restriction is applied to the provide interface of the primitive component APM, the connection is also affected by the user's explicit restriction, and accordingly the require interface of the primitive component COM is also affected by the user's explicit restriction (1241).

That is, if the provide interface of the primitive component APM is deleted, the require interface of the primitive component COM is also deleted.

In the description of the primitive component COM, the options and the variables of the require interface are defined, and also the values of the variables are set (1242).

For reference, as described above with reference to FIG. 12A, the option has already been to the require interface of the primitive component COM. In addition, the options and the variables are defined, and also the values of the variables are set.

Figure 12E:
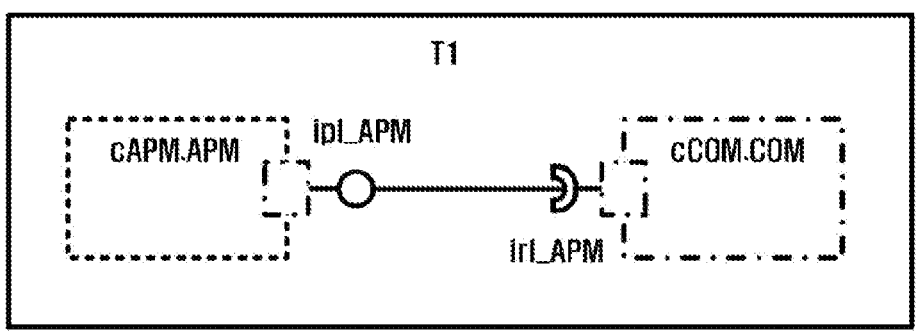

Next, from a description 1250 shown in FIG. 12E, if the user's explicit restriction is applied to the require interface of the primitive component COM, the primitive component COM is also affected by the user's explicit restriction.

That is, if the require interface of the primitive component COM is deleted, the primitive component COM is also deleted.

In the description of the composite component T1 as a parent component, the options and the variables of the primitive component COM are defined, and also the values of the variables are set (1251).

Furthermore, as described above, since the connection is deleted, the options and the variables of the connection are defined (1252), and also the values of the variables are set.

Figure 13:
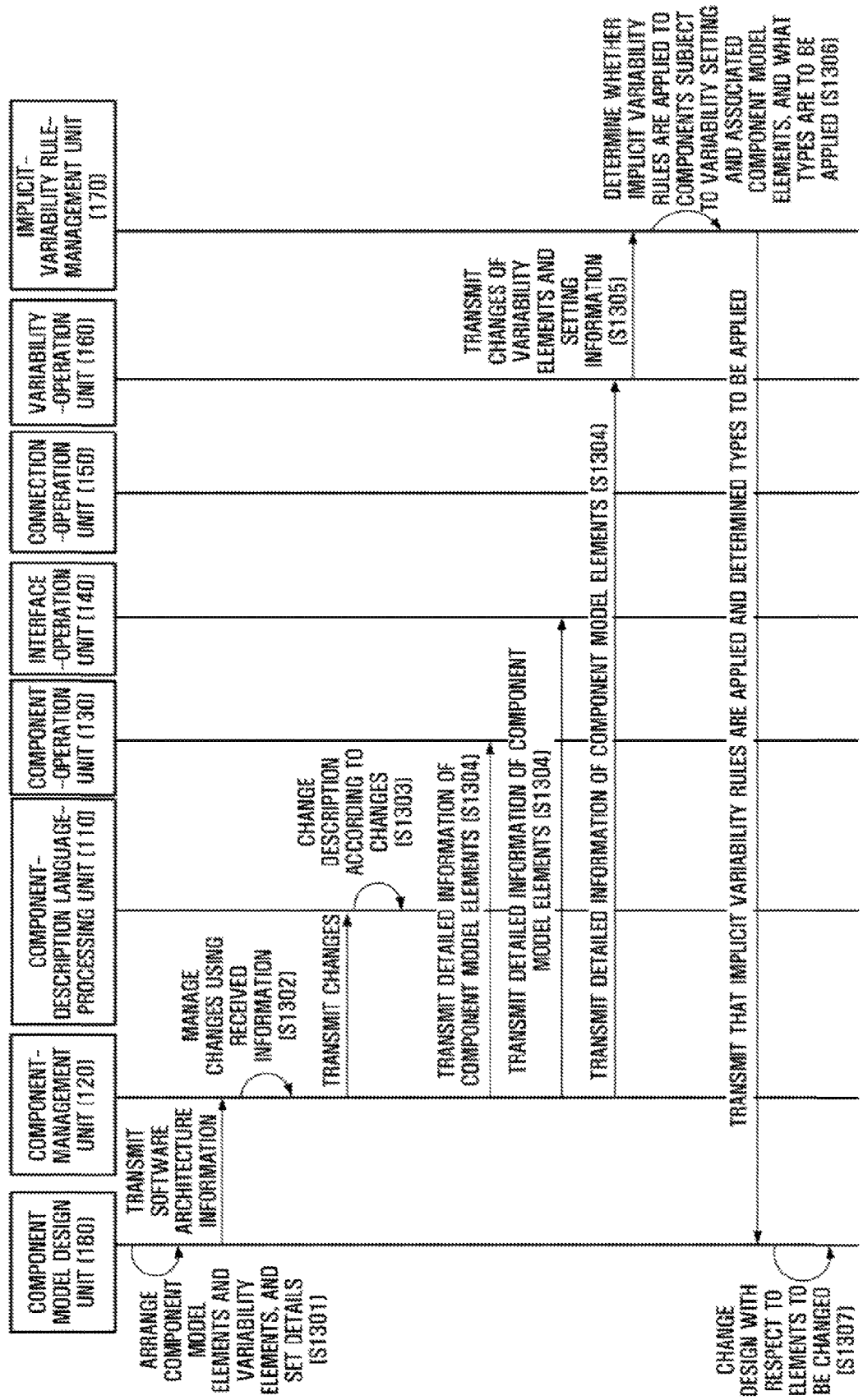
FIG. 13 is a diagram illustrating an implicit variability rule application process for software architecture design according to an exemplary embodiment of the present invention.

FIG. 13 is a diagram showing an implicit variability rule application process for software architecture design according to an exemplary embodiment of the present invention.

First, a design work is performed by the component model design unit 180 (operation S1301).

The design work includes arrangement and details of component, interface, connection, and variability elements forming a component model. If necessary, the interlocking configuration, such as the composite components and variability mapping, may be included.

After operation S1301, the component-management unit 120 stores the mutual relationship between the component model elements in the corresponding architecture and detailed information from software architecture design information by the component model design unit 180, and manages the changes (S1302).

After operation S1302, the component-description language-processing unit 110 describes the component model configuration in forms of descriptions, and changes the descriptions according to the design changes (operation S1303).

At this time, the component-description language-processing unit 110 follows the defined CDL description format, and generates descriptions synchronized with design information represented by the notations.

After operation S1303, the component-management unit 120 transmits the detailed information of the component model elements, which is analyzed and managed by the component-management unit 120, to the individual operation units. Then, each operation unit manages a list of the component model elements and the detailed information (operation S1304).

The variability-operation unit 160 transmits, to the implicit-variability rule-management unit 170, the changes of the variability elements and setting information, which are transmitted from the component-management unit 120, among the design information changed by the component model design unit 180 (operation S1305).

After operation S1305, with respect to variability elements, in which changes are made, the implicit-variability rule-management unit 170 determines whether the implicit variability rules are applied to the components subject to variability setting and associated component model elements, and what types are to be applied (S1306).

After operation S1306, if it is determined by the implicit-variability rule-management unit 170 that the implicit variability rules need to be applied, the component model design unit 180 changes design of elements to be changed (S1307).

After operation S1307, the component-management unit 120 updates and manages the mutual relationship between the component model elements and the detailed information again according to the changed design information (S1308).

Figure 14:
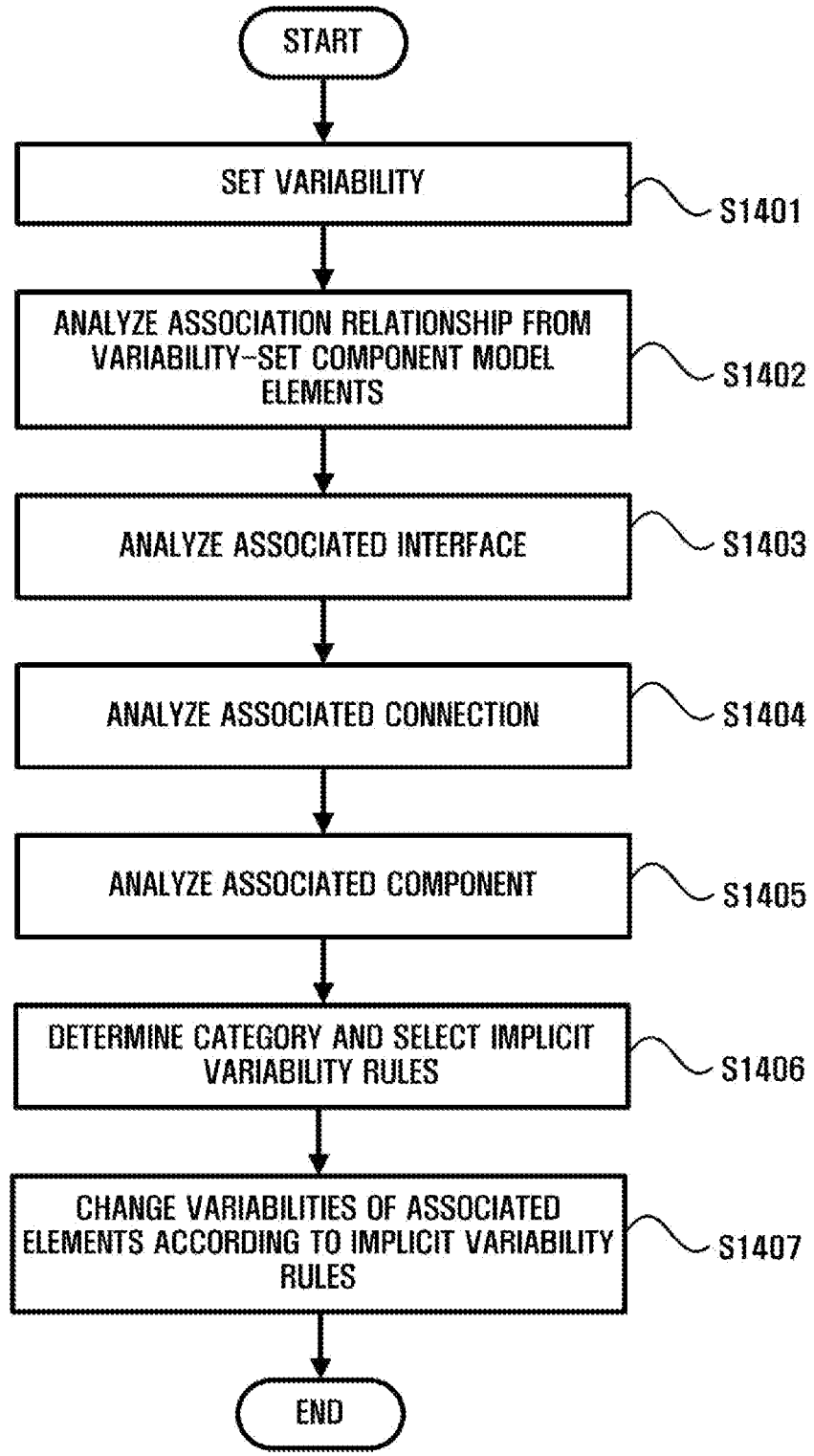
FIG. 14 is a flowchart illustrating an implicit variability rule category determination process according to an exemplary embodiment of the present invention.

FIG. 14 is a flowchart illustrating an implicit variability rule category determination process according to an exemplary embodiment of the present invention.

The flowchart shown in FIG. 14 may be executed by the category-determination unit 171 of the implicit-variability rule-management unit 170. Specifically, FIG. 14 shows a procedure that grasps the component model elements subject to variability setting, and determines what implicit variability rules are to be applied.

First, a variability setting work is performed by the component model design unit 180 (S1401).

At this time, information on the component model elements subject to the variability setting is transmitted to the implicit-variability rule-management unit 170 through the component-management unit 120 and the variability-operation unit 160.

The implicit-variability rule-management unit 170 analyzes the association relationship between the variability-set component model elements (S1402).

When a component is subjected to the variability setting, the implicit-variability rule-management unit 170 analyzes the relationship with an interface (S1403) and a connection (S1404) associated with the corresponding component, and neighboring components (S1405). This analysis is performed on the associated interfaces, connections, and components.

After operation S1405, the implicit-variability rule-management unit 170 determines a classification type of an implicit variability check table, that is, a category, and selects implicit variability rules to be applied according to the determined category (S1406).

For reference, the implicit variability check table is formed by tabulating the implicit variability rules.

After operation S1406, the variabilities of the associated elements are sequentially changed according to the implicit variability rules (S1407).

Figure 15:
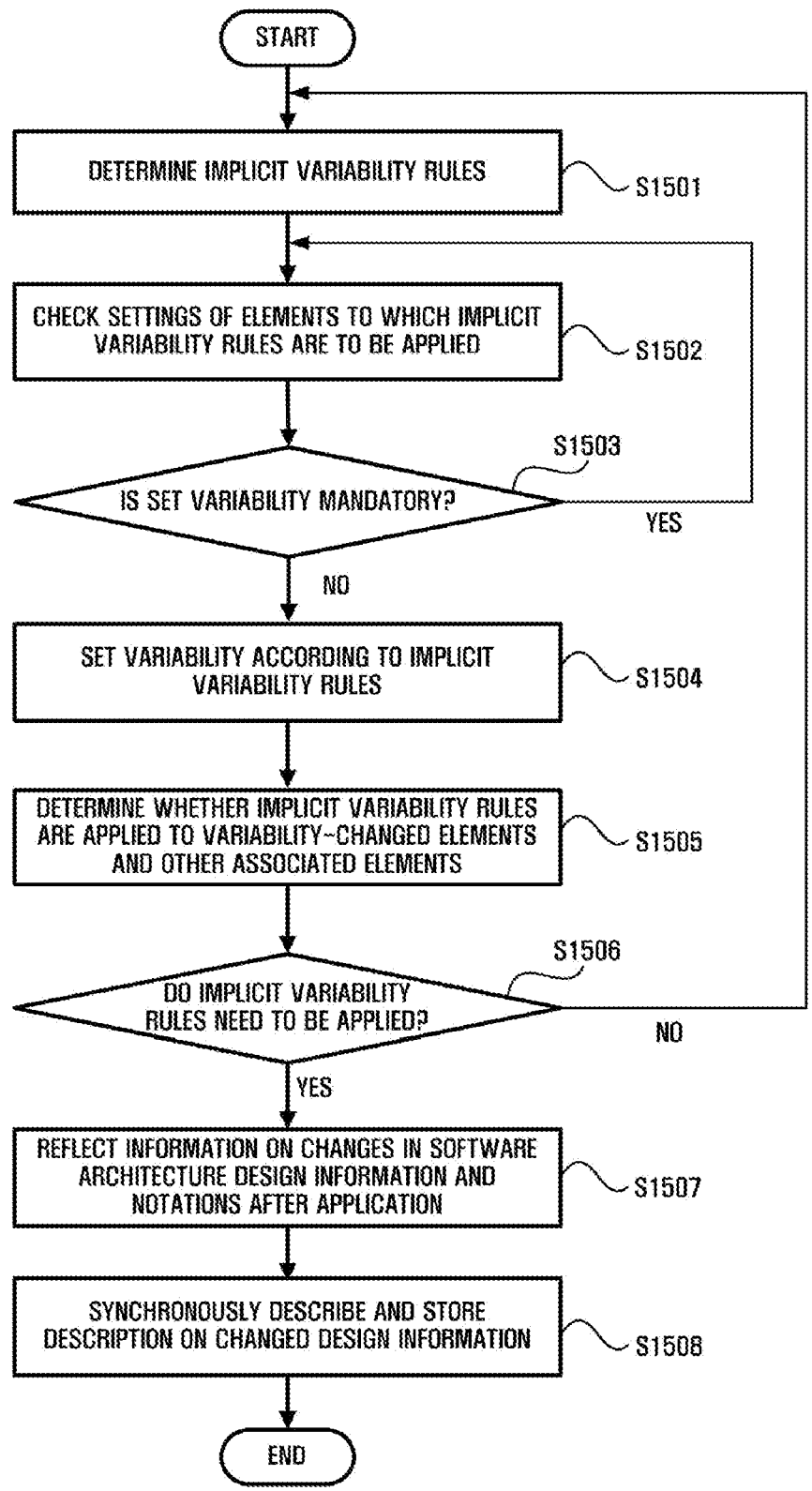
FIG. 15 is a flowchart illustrating an implicit variability rule application process according to an exemplary embodiment of the present invention.

FIG. 15 is a flowchart illustrating an implicit variability rule application process according to an exemplary embodiment of the present invention.

That is, FIG. 15 shows a procedure that set the variabilities on the component model elements, in which variability is set by a designer, and other associated elements according to the implicit variability rules.

First, the implicit-variability rule-management unit 170 determines the implicit variability rules to be applied in the design configuration with priority given to the explicitly variability-set component model elements (S1501).

After operation S1501, the settings of the elements, to which the implicit variability rules are to be applied, are checked (S1502).

After operation S1502, it is determined whether a corresponding element is marked "Mandatory" (S1503).

As a result, when "Mandatory" is marked, it is determined the designer explicitly declares that the implicit variability rules are not applied to the element. Then, Step S1502 is repeatedly performed to check the settings of the next element.

At operation (S1503), if it is determined that the element is not marked "Mandatory", the implicit variability rules can be applied. Then, the variability setting is performed according to the implicit variability rules, and the corresponding element is put in a list of variability-changed elements (S1504).

After operation S1504, with respect to the variability-changed elements according to the implicit variability rules, it is determined whether there are implicit variability rules that are recursively generated (S1505).

After operation S1505, with priority given to the variability-changed elements according to the implicit variability rules, it is determined whether the implicit variability rules need to be applied to other associated elements (S1506).

In operation S1506, if it is determined that new implicit variability rules need to be applied, operation S1501 is repeatedly performed starting with the corresponding element.

In operation S1506, if it is determined that the implicit variability rules are applied to all of the elements, information on the changes is transmitted to the component model design unit 180 to reflect in the software architecture design information and notations (S1507).

After operation S1507, the component-management unit 120 synchronously describes the descriptions of the changed design information, and stores and manages the descriptions (S1508).

Figure 16:
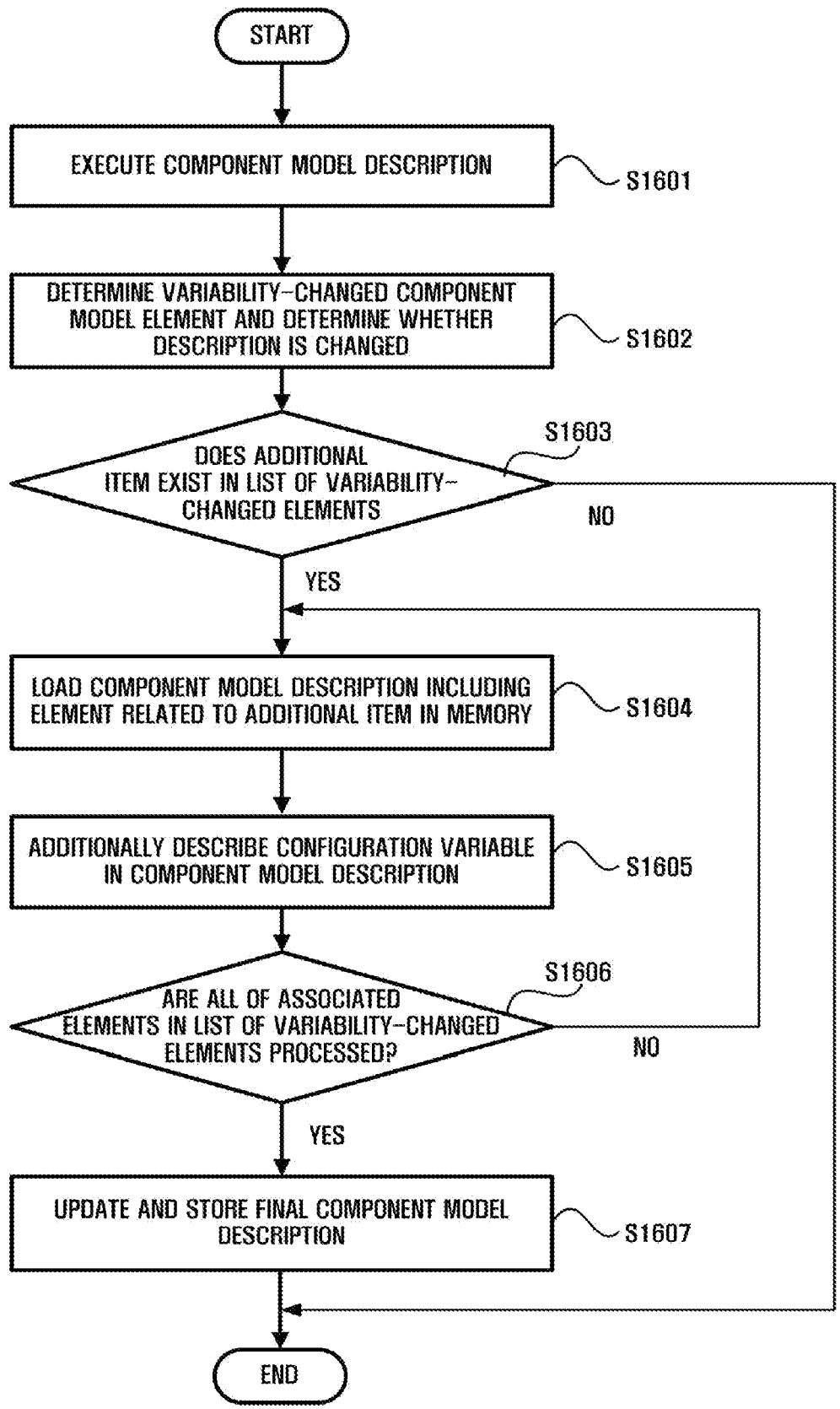
FIG. 16 is a flowchart showing a component model description synchronization process according to an exemplary embodiment of the present invention.

FIG. 16 is a flowchart illustrating a component model description synchronization process according to an exemplary embodiment of the present invention. Specifically, FIG. 16 shows a procedure that identically describes the design information changed by the component model design unit 180 by component model descriptions.

Generally, all of the design information is determined by the component-management unit 120, then described by the descriptions, instead of the notations, and subsequently managed as data required for internal processing.

To this end, first, the component-description language-processing unit 110 executes a component model description (S1601).

After operation S1601, the variability-changed component model elements are grasped, and it is determined whether a description is changed with reference to information on the list of the variability-changed elements, which is stored during the implicit variability rule application process (S1602).

After operation S1602, it is determined whether an additional item exists in the list of the variability-changed elements (S1603). If so, a component model description including a corresponding element is loaded into a memory (S1604).

In operation S1603, if it is determined that no additional item exists, the component model description is updated, and then the process ends.

After operation S1604, in a "configuration-variables" description block of the component model, additional configuration variables according to the implicit variability rules are described (S1605).

For reference, the configuration variables that are additionally described in the "configuration-variables" are reflected in a conditional statement within a specific description block of the component model description, such as "contains", "connects", "provides", and "requires".

This is to include the setting conditions of additional configuration variables, in addition to the setting conditions of the configuration variables in an existing conditional statement.

After operation S1605, it is determined whether all of the associated elements in the list of the variability-changed elements are processed (S1606). If so, the final component model description is updated and stored (S1607).

If it is determined in operation S1606 that all of the elements are not processed, operation S1603 is repeated.

Although the present invention has been described in connection with the exemplary embodiments of the present invention with reference to the accompanying drawings, it will be apparent to those skilled in the art that various modifications and changes may be made thereto without departing from the scope and spirit of the invention. Therefore, it should be understood that the above exemplary embodiments are not limitative, but illustrative in all aspects.

What is claimed is:

1. An apparatus for providing variability rules for component model and architecture design, said apparatus comprising:

a processor configured to set variability of component model elements to produce variability-set component model elements;

a category-determination unit which determines, via the processor, a category of implicit variability rules with respect to the variability-set component model elements and the component model elements associated with the variability-set component model elements;

an implicit-variability-rule-application unit which apply the implicit variability rules, which are given to the category, to the component model elements associated with the variability-set component model elements; and a variability-operation unit which manages a list of variability elements in the component model and setting condition information for each variability, wherein at least one from among the variability-set component model elements is designated as at least one from among optional, alternative, selective, and mandatory, and wherein the variability of the mandatory at least one of the variability-set component model elements is not automatically changed even when the implicit variability rules are applied.

2. The apparatus of claim 1, further comprising:

a component model design unit which changes variability notations of the component model elements, to which the implicit variability rules are applied.

3. The apparatus of claim 2, further comprising:
a component-description language-processing unit which processes a component description language (CDL), which describes a component model;
a component-management unit which maintains and changes the component model based on the component description language;
a component-operation unit which manages information on a list of components in the component model and dependency relationships between the components;
an interface-operation unit which manages a list of interface elements in the component model and connection information between a components and an interface; and
a connection-operation unit which manages a list of connection elements in the component model and connection information for each connection.

4. The apparatus of claim 1, wherein the option is independently given to the component model elements and selected according to conditions.

5. The apparatus of claim 1, wherein the alternative is commonly applied to a plurality of component model elements, and one component model element is inevitably selected.

6. The apparatus of claim 1, wherein the selective is commonly applied to a plurality of component model elements, and no component model element is selected or at least one component model element is selected.

7. A method of providing variability rules for component model and architecture design, the method comprising:
setting, via a processor, variability of component model elements to produce variability-set component model elements;
determining a category of implicit variability rules with respect to the variability-set component model elements and component model elements associated with the variability-set component model elements;
applying the implicit variability rules, which are given to the category, to the component model elements associated with the variability-set component model elements; and
managing a list of variability elements in the component model and setting condition information for each variability,
wherein at least one of the variability-set component model elements is designated as at least one from among optional, alternative, selective, and mandatory, and
wherein the variability of the mandatory at least one of the variability-set component model elements is not automatically changed even when the implicit variability rules are applied.

8. The method of claim 7, further comprising:
changing variability notations of the component model elements, to which the implicit variability rules are applied.

9. The method of claim 8, further comprising:
processing a component description language (CDL) which describes the component model;
maintaining and changing the component model based on the component description language;
managing information on a list of components in the component model and dependency relationships between the components;
managing a list of interface elements in the component model and connection information between a component and an interface; and
managing a list of connection elements in the component model and connection information for each connection.

10. The method of claim 7, wherein the option is independently given to the component model elements and selected according to conditions.

11. The method of claim 7, wherein the alternative is commonly applied to a plurality of component model elements, and one component model element is inevitably element.

12. The method of claim 7, wherein the selective is commonly applied to a plurality of component model elements, and no component model element is selected or at least one component model element is selected.

* * * * *